(12) United States Patent
Huang et al.

(10) Patent No.: US 10,148,404 B2
(45) Date of Patent: Dec. 4, 2018

(54) MULTI-USER REQUEST-TO-SEND CLEAR-TO-SEND (CTS) WITH NULL DATA PACKETS CTS AND RESPONSE POLLING

(71) Applicant: Intel IP Corporation, Santa Clara, CA (US)

(72) Inventors: Po-Kai Huang, West Lafayette, IN (US); Laurent Cariou, Portland, OR (US); Qinghua Li, San Ramon, CA (US); Xiaogang Chen, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/378,937

(22) Filed: Dec. 14, 2016

(65) Prior Publication Data

US 2017/0170939 A1      Jun. 15, 2017

Related U.S. Application Data

(60) Provisional application No. 62/266,999, filed on Dec. 14, 2015.

(51) Int. Cl.
*H04L 5/00* (2006.01)
*H04W 74/00* (2009.01)
*H04L 27/26* (2006.01)
*H04W 74/08* (2009.01)

(52) U.S. Cl.
CPC .......... *H04L 5/0053* (2013.01); *H04L 5/0007* (2013.01); *H04L 5/0025* (2013.01); *H04L 27/2613* (2013.01); *H04W 74/006* (2013.01); *H04W 74/0816* (2013.01)

(58) Field of Classification Search
None
See application file for complete search history.

(56) References Cited

U.S. PATENT DOCUMENTS

| | | | | |
|---|---|---|---|---|
| 2011/0176627 | A1* | 7/2011 | Wu | H04B 7/0452 375/260 |
| 2012/0134324 | A1* | 5/2012 | Chu | H04W 74/0816 370/329 |

(Continued)

*Primary Examiner* — Steven H Nguyen
(74) *Attorney, Agent, or Firm* — Schwegman Lundberg & Woessner, P.A.

(57) ABSTRACT

Methods, apparatuses, computer readable media for multi-user (MU) request-to-send (RTS) and clear-to-send (CTS) with null data packet (NDP) CTSs and response polling. An apparatus of a wireless device comprising processing circuitry is disclosed. The processing circuitry may be configured to encode a MU-RTS including station identifications and indications of 20 MHz channels for the stations to transmit CTSs. The processing circuitry may be configured to configure the access point to transmit the MU-RTS. The processing circuitry may be configured to encode a trigger frame for polling, the trigger frame including the station identifications and indications of short feedback resource units for the stations identified by the station identifications. The processing circuitry may be configured to decode short feedback from the stations in accordance with the short feedback resource units where the short feedback is in response to the trigger frame for polling and the MU-RTS.

25 Claims, 14 Drawing Sheets

(56) References Cited

U.S. PATENT DOCUMENTS

| | | | |
|---|---|---|---|
| 2015/0172025 A1* | 6/2015 | Kwon | H04W 52/0216 370/329 |
| 2015/0358995 A1* | 12/2015 | Li | H04L 5/0007 370/329 |
| 2016/0113009 A1* | 4/2016 | Seok | H04B 7/0452 370/329 |
| 2016/0113034 A1* | 4/2016 | Seok | H04W 74/04 370/329 |
| 2016/0227533 A1* | 8/2016 | Josiam | H04W 74/006 |
| 2016/0262173 A1* | 9/2016 | Josiam | H04B 7/0452 |
| 2016/0330757 A1* | 11/2016 | Cherian | H04W 72/1268 |
| 2018/0054810 A1* | 2/2018 | Shinohara | H04W 72/0406 |

\* cited by examiner

MULTI-USER REQUEST-TO-SEND CLEAR-TO-SEND (CTS) WITH NULL DATA PACKETS CTS AND RESPONSE POLLING

PRIORITY CLAIM

This application claims the benefit of priority under 35 USC 119(e) to U.S. Provisional Patent Application Ser. No. 62/266,999, filed Dec. 14, 2015, which is incorporated herein by reference in its entirety.

TECHNICAL FIELD

Embodiments relate to Institute of Electrical and Electronic Engineers (IEEE) 802.11. Some embodiments relate to high-efficiency (HE) wireless local-area networks (WLANs). Some embodiments relate to IEEE 802.11ax. Some embodiments relate computer readable media, methods, and apparatuses for multi-user (MU) request-to-send (RTS) (MU-RTS) and clear-to-send (CTS) (MU-CTS) with null data packet (NDP) CTS (NDP-CTS) and response polling.

BACKGROUND

Efficient use of the resources of a wireless local-area network (WLAN) is important to provide bandwidth and acceptable response times to the users of the WLAN. However, often there are many devices trying to share the same resources and the devices may interfere with one another. Additionally, the wireless devices may be moving and the signal quality may be changing. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
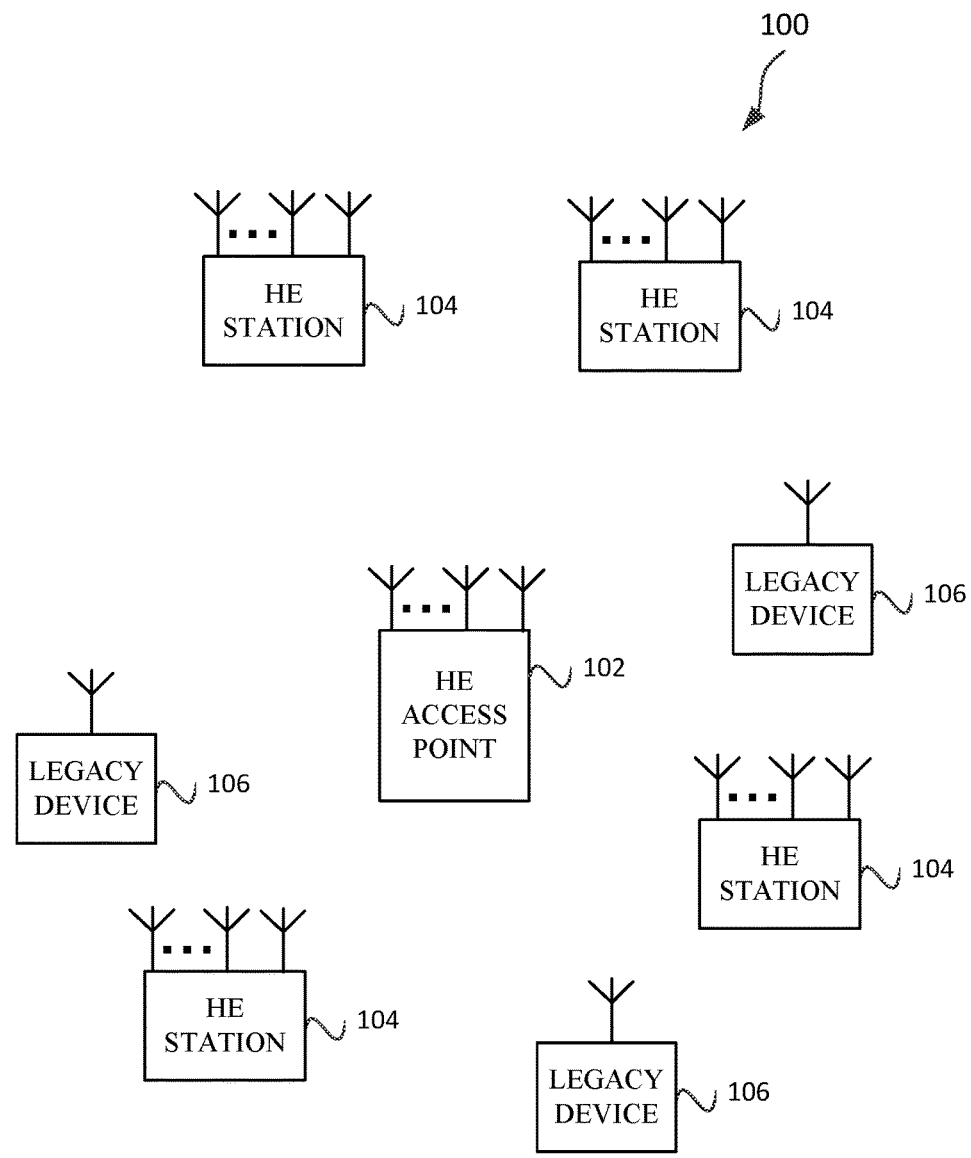
FIG. 1 illustrates a WLAN in accordance with some embodiments.

FIG. 1 illustrates a WLAN 100 in accordance with some embodiments. The WLAN 100 may comprise a basis service set (BSS) 100 that may include a HE access point 102, which may be an AP, a plurality of high-efficiency wireless (e.g., IEEE 802.11ax) (HE) stations 104, and a plurality of legacy (e.g., IEEE 802.11n/ac) devices 106.

The HE access point 102 may be an AP using the IEEE 802.11 to transmit and receive. The HE access point 102 may be a base station. The HE access point 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE access point 102 that is part of an extended service set (ESS). A controller (not illustrated) may store information that is common to the more than one HE access points 102.

The legacy devices 106 may operate in accordance with one or more of IEEE 802.11 a/b/g/n/ac/ad/af/ah/aj/ay, or another legacy wireless communication standard. The legacy devices 106 may be STAs or IEEE STAs. The HE STAs 104 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 104 may be termed high efficiency (HE) stations.

The HE access point 102 may communicate with legacy devices 106 in accordance with legacy IEEE 802.11 communication techniques. In example embodiments, the HE access point 102 may also be configured to communicate with HE STAs 104 in accordance with legacy IEEE 802.11 communication techniques.

In some embodiments, a HE frame may be configurable to have the same bandwidth as a channel. The HE frame may be a physical (PHY) layer convergence procedure (PLCP) protocol data unit (PPDU). In some embodiments, there may be different types of PPDUs that may have different fields and different physical layers and/or different media access control (MAC) layers. In some embodiments, there may be different PPDU formats for different communication standards, e.g., a non-HT PPDU for IEEE 802.11a, HT PPDU for IEEE 802.11n, VHT PPDU for IEEE 802.11ac, or HE PPDU for IEEE 802.11ax.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE access point 102, HE STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE access point 102 may operate as a HE access point which may be arranged to contend for a wireless medium (e.g., during a contention period) to receive exclusive control of the medium for an HE control period. In some embodiments, the HE control period may be termed a transmission opportunity (TXOP). The HE access point 102 may transmit a HE master-sync transmission, which may be a trigger frame or HE control and schedule transmission, at the beginning of the HE control period. The HE access point 102 may transmit a time duration of the TXOP and sub-channel information. During the HE control period, HE STAs 104 may communicate with the HE access point 102 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE access point 102 may communicate with HE stations 104 using one or more HE frames. During the HE control period, the HE STAs 104 may operate on a sub-channel smaller than the operating range of the HE access point 102. During the HE control period, legacy stations refrain from communicating. The legacy stations may need to receive the communication from the HE access point 102 to defer from communicating.

In accordance with some embodiments, during the TXOP the HE STAs 104 may contend for the wireless medium with the legacy devices 106 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE access point 102 may also communicate with legacy stations 106 and/or HE stations 104 in accordance with legacy IEEE 802.11 communication techniques. In some embodiments, the HE access point 102 may also be configurable to communicate with HE stations 104 outside the HE TXOP in accordance with legacy IEEE 802.11 communication techniques, although this is not a requirement.

In some embodiments the HE station 104 may be a "group owner" (GO) for peer-to-peer modes of operation. A wireless device may be a HE station 102 or a HE access point 102.

In some embodiments, the HE station 104 and/or HE access point 102 may be configured to operate in accordance with IEEE 802.11mc. A HE station 104 and/or HE access point 102 may be termed an HE device (e.g., station or AP), if the HE device complies with a wireless communication standard IEEE 802.11ax.

In some embodiments, the HE stations 104 may have limited power. In some embodiments, the HE stations 104 may have limited power and may transmit on an RU less than 20 MHz in order to reach the HE access point 104.

In example embodiments, the HE station 104 and/or the HE access point 102 are configured to perform the methods and functions described herein in conjunction with FIGS. 1-13.

Figure 2:
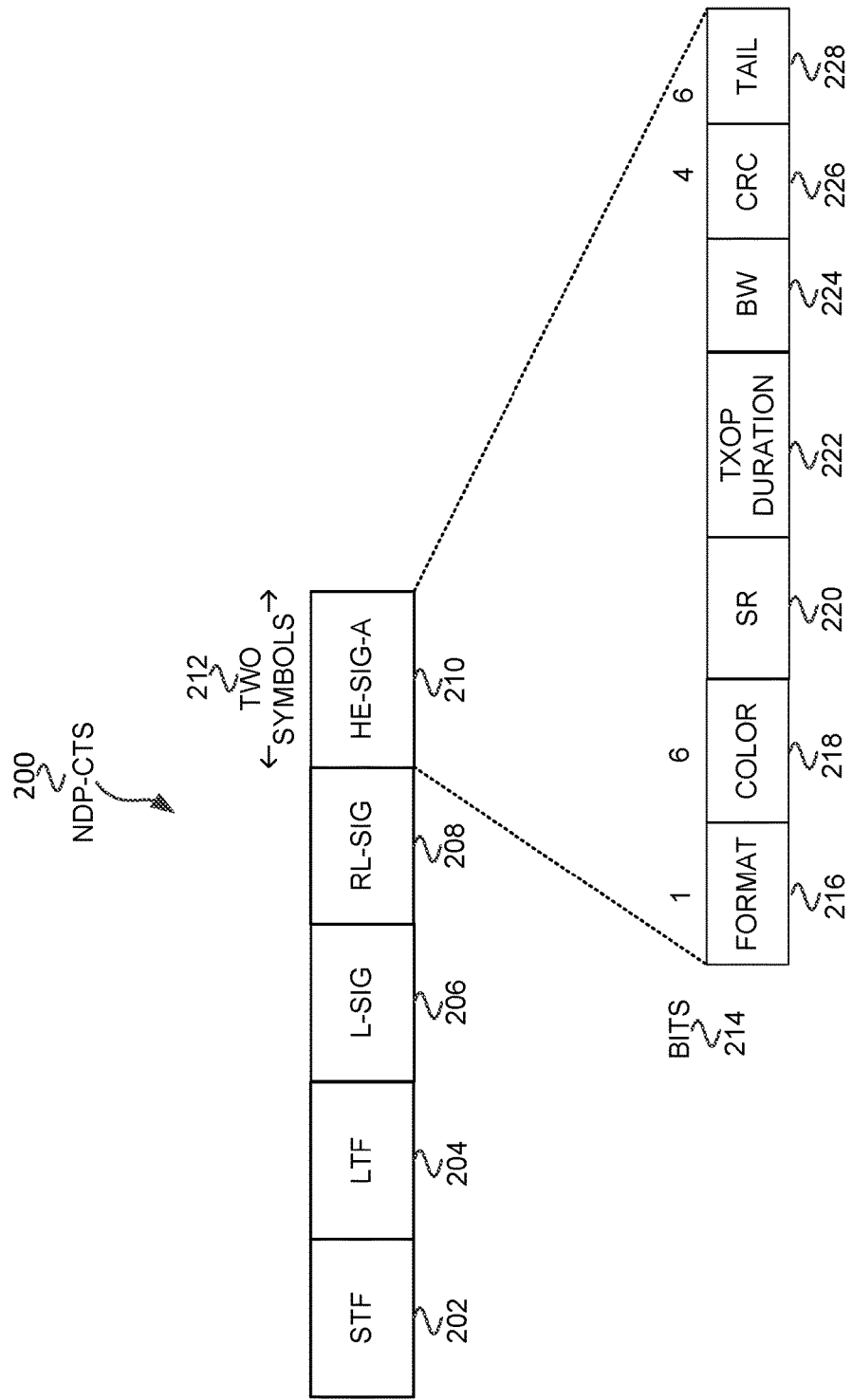
FIG. 2 illustrates a NDP-CTS in accordance with some embodiments.

FIG. 2 illustrates a NDP-CTS 200 in accordance with some embodiments. The NDP-CTS 200 may include one or more of short-training field (STF) 202, long-training field (LTF) 204, legacy signal (L-SIG) 206 field, repeated L-SIG (RL-SIG) 208, and HE-SIG-A 210 field. In some embodiments, the STF 202 is binary phase shift keying (BPSK) modulated at 6 Mbps. In some embodiments, the STF 202 may have a duration of 8 us made of ten 0.8 us symbols. In some embodiments, the LTF 204 is an OFDM symbol that is BPSK modulated at 6 Mbps. In some embodiments, the LTF 204 includes no channel coding and is not scrambled. In some embodiments, the STF 202 and LTF 204 are used by a receiver to calibrate and synchronize reception of a received signal.

In some embodiments, the L-SIG 204 is OFDM symbol and modulated with BPSK at 6 Mbps with a ½ encoding rate. The L-SIG 206 field may include one or more fields. The L-SIG 206 field includes fields to indicate a data rate and length of the frame.

The HE-SIG-A 210 may be two symbols 212 in accordance with some embodiments. HE-SIG-A 210 includes one or more of a format 216 field, color 218 field, spatial reuse (SR) 220 field, TXOP duration 222 field, bandwidth (BW) 224 field, cyclic redundancy check (CRC) 226 field, and a tail 228 field. A number of bits 214 is indicated for fields 216, 218, 226, and 228. The format 216 field may indicate whether a PPDU including the HE-SIG-A 210 field is a single user (SU) PPDU or trigger-based uplink (UL) PPDU. The color 218 field is an identifier of the BSS of the HE station 104 and/or HE access point 102 that transmitted the NDP-CTS 200. The SR 220 field is an indicator of SR parameters. The TXOP duration 222 field indicates a remaining time of a current TXOP. The BW 224 field indicates a BW. In some embodiments, the tail 228 field may be bits to unwind a convolutional code.

The NDP-CTS 200 may be a HE PPDU. NDP-CTS 200 has no has no data portion. The NDP-CTS 200 may be a HE PPDU. In some embodiments, NDP-CTS 200 requires less time to transmit than other CTSs, e.g. NDP-CTS 200 13.6 µs transmission time is saved by not having a MAC portion (data portion) as part of the NDP-CTS 200 so that the NDP-CTS 200 transmission time may be 32 µs.

Figure 3:
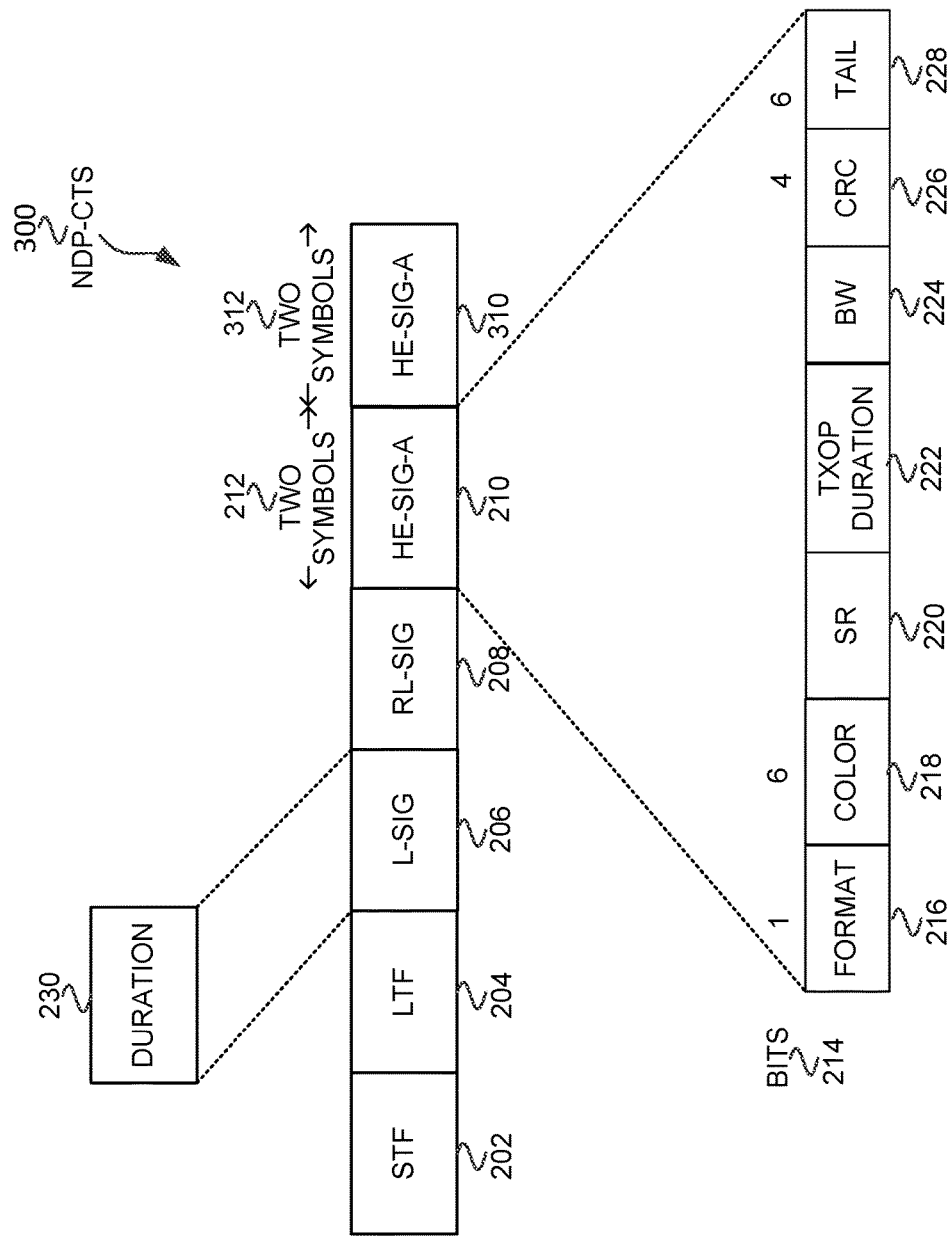
FIG. 3 illustrates a NDP-CTS in accordance with some embodiments.

FIG. 3 illustrates a NDP-CTS 300 in accordance with some embodiments. NDP-CTS 300 may include a duplicated HE-SIG-A 310, which may be a duplicate of HE-SIG-A 210. HE-SIG-A 310 may be two symbols 312, which is the same as HE-SIG-A 210.

Figure 4:
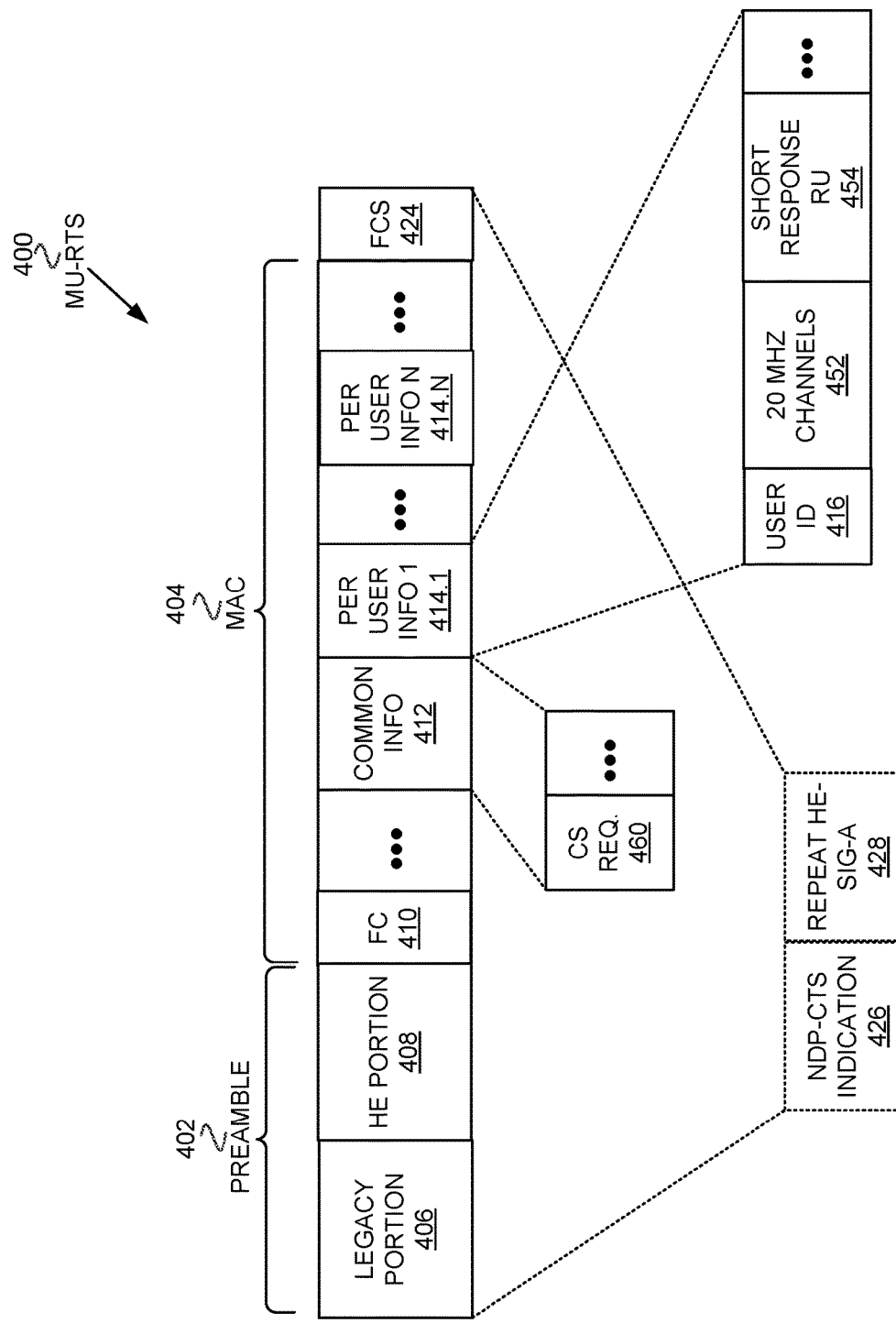
FIG. 4 illustrates a MU-RTS in accordance with some embodiments.

FIG. 4 illustrates a MU-RTS 400 in accordance with some embodiments. In some embodiments, the MU-RTS 400 includes preamble 402, MAC 404, and frame check sequence (FCS) 424. The preamble 402 may include a legacy portion 406 (e.g., L-SIG) and an HE portion 408 (e.g., a HE-SIG-A 400). The MAC 404 may include frame control (FC) 410, common information 412, and per user information 1 414.1 through per user information N 414.N. The FC 410 may include information indicating the type of frame, e.g., MU-RTS, a protocol version (e.g., IEEE 802.11ax), type of frame, etc. The MAC 404 may be part of a separate frame format or may be data that is carried in a MAC portion of a HE PPDU.

The common information 412 may include information that is common to the users or HE stations 104. The common information 412 may include information for decoding the MU-RTS 400 or decoding subsequent frames. The common information 412 may include information for encoding frames to the HE access point 102 as well as information regarding the TXOP, e.g., what frames the HE stations 102 are to encode. The common information 412 may include carrier sense (CS) required 460 which may be an indication of whether the stations should perform a CS before transmitting a CTS. In some embodiments, the CS required 460 may indicate whether the stations are to perform a physical and/or virtual CS. In some embodiments, CS required 460 may be included in a different field, e.g., the per user information 414.

The per user information 414 includes user ID 416, 20 MHz channels 452, and short response RU 454, in accordance with some embodiments. In some embodiments, per user information 414 includes one or more of modulation and coding scheme (MCS), spatial stream allocation, response, as well as other fields.

The user ID 416 may be an ID of the HE station 104 (e.g., an association, AID or pre-association ID). The 20 MHz channels 452 may indicate one or more 20 MHz channels for the HE station 104 to transmit a CTS. The 20 MHz channels may be indicated by multiple fields of the MU-RTS 400.

The 20 MHz channels 452 may be indicated in one of the following ways: a same 20 MHz channel as a corresponding short feedback resource unit of the indications of short feedback resource units, 20 MHz channels in a primary 40 MHz channel if a corresponding short feedback resource unit is in a secondary 20/40/80 MHz channel, 20 MHz channels in a primary 80 MHz channel if a short feedback resource unit is in a secondary 40/80 MHz channel, 20 MHz channels in a secondary 80 MHz channel if a short feedback resource unit 454 is in a secondary 80 MHz channel.

The short response RU 454 may indicate an RU for the HE station 104 to transmit a response individually. For example, in FIG. 6 each HE station 104 is allocated one of nine short response RUs of a 20 MHz channel. In some embodiments, short response RU 454 may indicate a 20 MHz channel and then a portion of the 20 MHz channel for the HE station 104 to transmit the response. In some embodiments, short response RU 454 may indicate a code for the HE station 104 to transmit on the short response RU 454. In some embodiments, the short response RU 454 indicates a time differentiation and an RU for the HE station 104 to use, e.g., one of eight different time slots for a same RU. In some embodiments, the short response RU 454 may be one or more tones for the HE station 104 to transmit on. In some embodiments, the short response RU 430 may be one or more tones and an indication of a time differentiation (e.g., one of eight time slots.) The HE station 104 may then transmit energy in the time slot and on the RU to indicate the HE station 104 is responding, e.g., that the HE station 104 transmitted a NDP-CTS or CTS on a corresponding 20 MHz channel. The FCS 424 may provide error correction information. In some embodiments, the short response RU 454 is termed differently, e.g., RU 454.

The MU-RTS 400 may include NDP-CTS indication 426 and/or repeat HE-SIG-A 428. NDP-CTS indication 426 may indicate whether the HE station 104 is to use a NDP-CTS 200, 300 or not, e.g., a NDP-CTS 200, 300 or a CTS. Repeat HE-SIG-A 428 may indicate whether a NDP-CTS 200, 300 is to include a duplicate or repeat HE-SIG-A, e.g., HE-SIG-A 310 of NDP-CTS 300.

Figure 5:
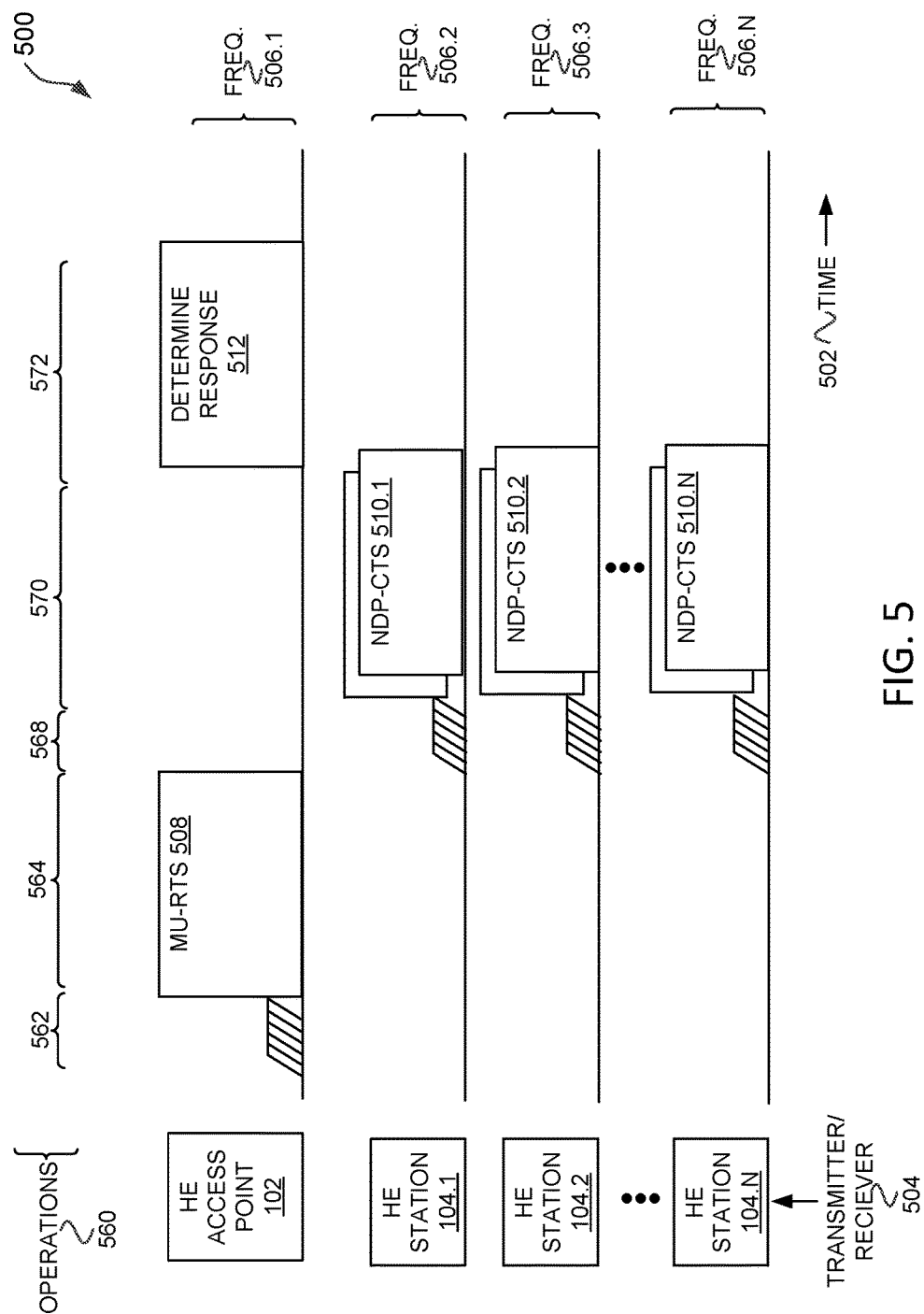
FIG. 5 illustrates a method for MU-RTS with NDP-CTSs in accordance with some embodiments.

FIG. 5 illustrates a method 500 for MU-RTS with NDP-CTSs in accordance with some embodiments. Illustrated in FIG. 5 is time 502 along a horizontal axis, transmitter/receiver 504 along a vertical axis, frequency 506 along a vertical axis, and operations 560 along the top.

The frequencies 506 may be a bandwidth, channel, or RU. The frequencies 506 may overlap, e.g., frequency 506.1 may be the same as frequency 506.2. In some embodiments, HE stations 104.1 through HE stations 104.N may be HE stations 104.

The method 500 may begin at operation 562 with the HE access point 102 contending for the wireless medium, e.g., the HE access point 102 may perform a clear channel assessment (CCA) and/or perform other operations in accordance with one or more wireless communication standards.

The method 500 may continue at operation 564 with the HE access point 102 transmitting a MU-RTS 508 on frequency 506.1. The MU-RTS 508 may be a MU-RTS 400 as described in conjunction with FIG. 4.

Optionally, the method 500 continues at operation 568 with the HE stations 104 waiting a short inter-frame space (SIFS) and performing a CCA. The HE stations 104 may perform a CCA if CS required 460 is set, in accordance with some embodiments.

The method 500 continues at operation 570 with each HE station 104 transmitting one or more NDP-CTSs 510. In some embodiments, if the CCA at operation 568 indicates busy then the HE station 104 does not transmit the NDP-CTS 510. In some embodiments, the HE station 104 may evaluate whether it can transmit the NDP-CTS 510 based on whether CCA indicates busy and whether one or more NAV indicate busy. In some embodiments, if the CCA is busy, the HE station 104 may determine if a frame is from an inter or intra PPDU. In some embodiments, the MU-RTS 508 or a previous information element will indicate whether the HE station 104 should perform the CCA. In some embodiments, the MU-RTS 508 or a previous information element will indicate whether the HE station 104 should transmit even if the CCA is busy.

In some embodiments, the NDP-CTSs 510 are HE PPDUs. The NDP-CTS may be NDP-CTSs 200 or NDP-CTSs 300 in accordance with some embodiments. In some embodiments, the HE stations 104 are configured to determine a format for the CTS based on a PHY format of the MU-RTS 508, e.g., if the MU-RTS 508 is carried in a non-HT PPDU, then the HE stations 104 transmit CTSs in non-HT PPDU; if the MU-RTS 508 is carried in a HT PPDU, then the HE stations 104 transmit CTSs in HT PPDUs; if the MU-RTS 508 is carried in a very-high throughput (VHT) PPDU, then the HE stations 104 transmit CTSs in VHT PPDU; and, if the MU-RTS 508 is carried in a HE PPDU, then the HE stations 104 transmit CTSs in HE PPDUs.

In some embodiments, the MU-RTS 508 indicates that the response should be a NDP-CTS 200, 300, e.g., NDP-CTS indication 426 may indicate whether the NDP-CTS 510 should be a NDP-CTS 200, 300. In some embodiments, the NDP-CTSs 510 are NDP-CTSs 200 or NDP-CTSs 300 based on a communication standard or an information element received by the HE stations 104, e.g., repeat HE-SIG-A 428 may indicate whether the HE-SIG-A 210 should be repeated as HE-SIG-A 310.

In some embodiments, frequency 506.2 through frequency 506.N used by HE station 104.1 through HE station 104.N, respectively, are 20 MHz channels. In some embodiments, one or more of the frequencies 506 overlap. For example, HE station 104.1 and HE station 104.2 may be transmitting on the same RU. HE stations 104 may transmit more than one NDP-CTS 510, e.g., HE station 104.1 may transmit NDP-CTS 510.1 on a primary 20 MHz channel and a secondary 40 MHz channel. As another example, HE station 104.1 may transmit NDP-CTS 510.1 on a primary 20 MHz channel and HE station 104.2 may transmit a NDP-CTS 510.2 on the primary 20 MHz channel simultaneously with HE station 104.1 and transmit simultaneously another NDP-CTS 502.2 on another 20 MHz channel.

In some embodiments, the HE-SIG-A 210 (and 310 for duplicated or repeated) has the same content for each of the HE stations 104. In some embodiments, the content of the HE-SIG-A 210 (and 310 for duplicated or repeated) is indicated by the MU-RTS 508 and/or a previous information element. In some embodiments, the MU-RTS 508 indicates which RUs a HE station 104 should transmit the NDP-CTS 510. For example, HE station 104.1 may transmit the NDP-CTS 510 in a 20 MHz channel and one or more secondary 20 MHz channels. The 20 MHz channels 452 may indicate the 20 MHz channels that the NDP-CTSs 510 are to be transmitted on, in accordance with some embodiments.

Optionally, the method 500 continues at operation 572 with HE access point 102 determining responses 512. For example, in some embodiments, the HE access point 102 may determine that a HE station 104 (or HE stations 104 if more than one is assigned the same 20 MHz channel) responded if the HE access point 102 detects a NDP-CTS 510 (e.g., STF 202 and/or LTF 204) on the 20 MHz channel assigned to the HE station 104. In some embodiments, the HE access point 102 may determine that a HE station 104 (or HE stations 104 if more than one is assigned the same 20 MHz channels) responded if the HE access point 102 detects a RL-SIG 208 on the 20 MHz channel assigned to the HE station 104 SIFTS time plus the time to transmit the field before the RL-SIG 208 after the end of the transmission of the MU-RTS 508.

In some embodiments, the PHY frame format of non-HT PPDU, HT PPDU, or VHT PPDU, does not permit the HE access point 102 to determine which devices respond with a CTS due to overlapping CTS transmissions.

Figure 6:
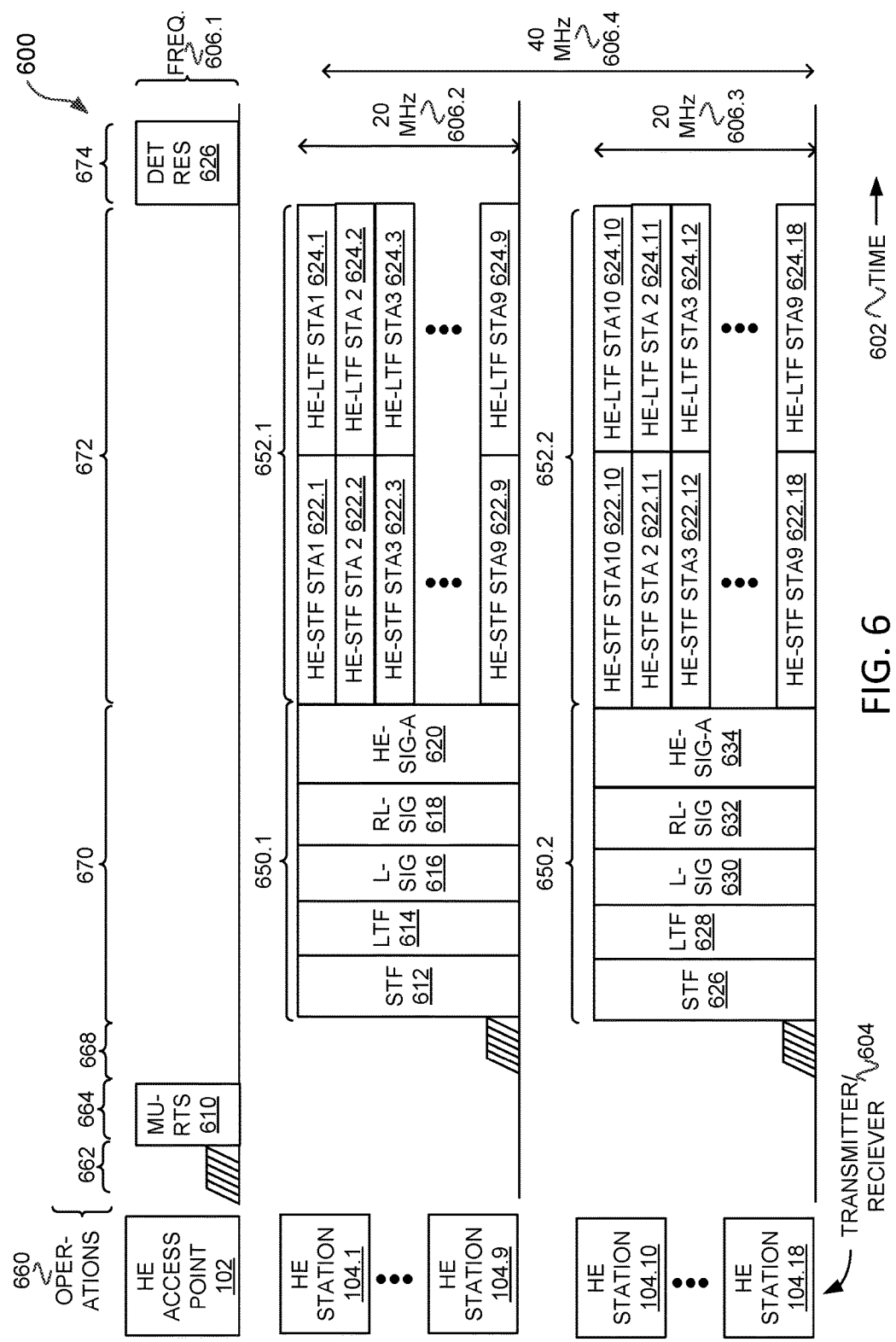
FIG. 6 illustrates a method for MU-RTS with NDP-CTSs in accordance with some embodiments.

FIG. 6 illustrates a method 600 for MU-RTS with NDP-CTSs in accordance with some embodiments. Illustrated in FIG. 6 is time 602 along a horizontal axis, transmitter/receiver 604 along a vertical axis, frequency 606 along a vertical axis, and operations 660 along the top.

The frequencies 606 may be a bandwidth, channel, or RU. The frequencies 606 may overlap, e.g., frequency 606.1 may be the same as frequency 606.2. Frequency 606.2 may be a 20 MHz primary channel of a 40 MHz 606.4 primary channel. Frequency 606.3 may be a 20 MHz secondary channel of a 40 MHz 606.4 primary channel. Frequency 606.1 may be the 20 MHz primary channel of the 40 MHz 606.4, which is the same as 20 MHz 606.2. In some embodiments, HE stations 104.1 through HE stations 104.18 may be HE stations 104.

The method 600 may begin at operation 662 with the HE access point 102 contending for the wireless medium, e.g., the HE access point 102 may perform a clear channel assessment (CCA) and/or perform other operations in accordance with one or more wireless communication standards.

The method 600 may continue at operation 664 with the HE access point 102 transmitting a MU-RTS 610 on frequency 606.1. The MU-RTS 610 may be an MU-RTS 400 as described in conjunction with FIG. 4. The MU-RTS 610 may include 20 MHz channels 452 for each HE station 104 to transmit on and short response RU 454 for the HE station 104 to transmit a response indication 652. As illustrated the response indication 652 is a HE-STF 622 and HE-LTF 624. In some embodiments, the response indication 652 may be different, e.g., only HE-STF 622, a single tone being transmitted, a pattern, a combination of one or more tones and a pattern, etc.

The method 600 continues at operation 668 with the HE stations 104 waiting a SIFS and, optionally, performing a CCA. The method 600 continues at operation 670 with the HE stations 104 transmitting NDP-CTS 650s. In some embodiments, if the CCA indicates the frequency 606 is busy, the HE stations 104 may not transmit on that frequency 606. The MU-RTS 610 may indicate multiple 20 MHz channels for a HE station 104 to transmit on, e.g., 20 MHz channels 452. The HE stations 104 may perform a CCA on each of the channels indicated by the MU-RTS 610 and only transmit on the channels that are not indicated as busy. The MU-RTS 610 may include CS required 460 which may indicate how the HE stations 104 are to determine whether the frequency 606 is busy, e.g., perform CCA, check one or more NAV, lower transmit power if frequency 606 is busy, etc.

As illustrated, the HE stations 104 are each only transmitting on one frequency 606, but the HE stations 104 may transmit on multiple frequencies 606 based on the MU-RTS 610 and results of the CCA.

STF 612, 626 may be a STF 202 as described in conjunction with FIGS. 2 and 3. LTF 614, 628 may be a LTF 204 as described in conjunction with FIGS. 2 and 3. L-SIG 616, 630 may be a STF 206 as described in conjunction with FIGS. 2 and 3. RL-SIG 618, 632 may be a RL-SIG 208 as described in conjunction with FIGS. 2 and 3. HE-SIG-A 620, 634 may be a HE-SIG-A 210 as described in conjunction with FIGS. 2 and 3. In some embodiments, a repeated or duplicated HE-SIG-A may be transmitted by the HE stations 104, e.g., HE-SIG-A 310 of NDP-CTS 300.

The HE stations 104 may all simultaneously transmit the same STF 612, 626, LTF 614, 628, L-SIG 616, 630, RL-SIG 618, 632, and HE-SIG-A 620, 634.

The method 600 continues at operation 672 with the HE stations 104 transmitting response indications 652. The response indications 652 may be HE-STF 622 followed by a HE-LTF 624.

Optionally, the method 600 optionally continues at operation 674 with the HE access point 102 determining responses (det res) 626. The HE access point 102 may be able to determine which HE stations 104 responded to the MU-RTS 610 because the response indications 652 are transmitted on separate short response RUs 454 whereas the NDP-CTSs 650 may have multiple HE stations 104 transmitting on the same frequency 606. The HE access point 102 is thus able to determine which HE stations 104 responded. In some embodiments, the MU-RTS 610 provides a short response RU 454 for response indications 652 for each frequency 606 (20 MHz channel, 40 MHz channel, 80 MHz channel, or 80+80 MHz channel) that the HE station 104 is to transmit on. As disclosed in conjunction with FIG. 4, in some embodiments, the HE stations 104 may transmit on one or more tones and/or during a time slot to indicate a response. The HE access point 102 may interpret the response from the HE station 104 as indicating the HE station 104 is free on the corresponding 20 MHz channel.

Figure 7:
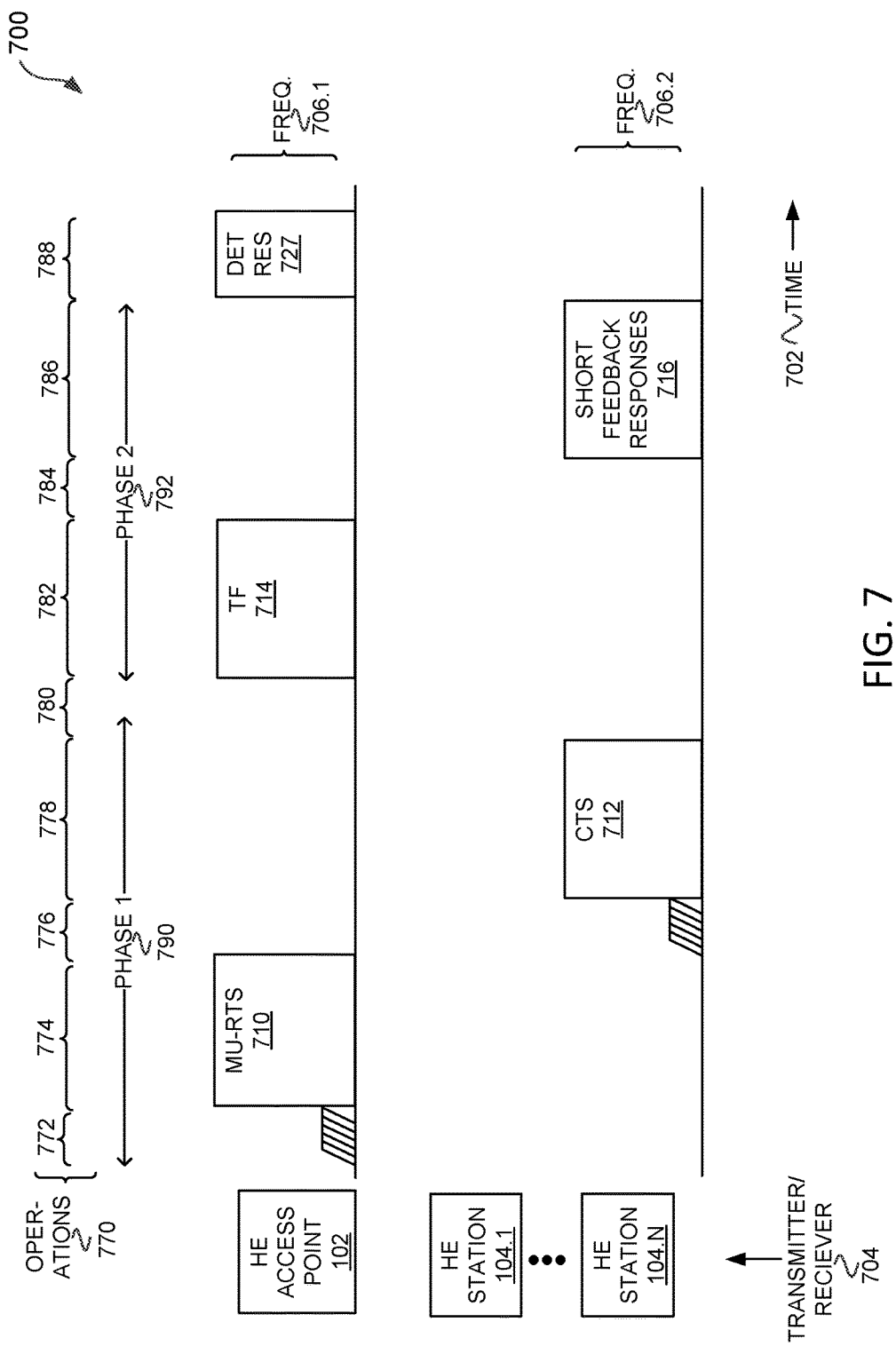
FIG. 7 illustrates a method for MU-RTS in accordance with some embodiments.

FIG. 7 illustrates a method 700 for MU-RTS in accordance with some embodiments. Illustrated in FIG. 7 is time 702 along a horizontal axis, transmitter/receiver 704 along a vertical axis, frequency 706 along a vertical axis, and operations 760 along the top.

The frequencies 706 may be a bandwidth, channel, or RU. The frequencies 706 may overlap, e.g., frequency 706.1 may be the same as frequency 706.2. The bandwidth of a frequency 706 may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a frequency 706 is less than 20 MHz, e.g., a bandwidth of a number of subcarriers such as 26, 52, 106, or 242. In some embodiments, HE stations 104.1 through HE stations 104.18 are HE stations 104.

The method 700 begins at operation 772 with the HE access point 102 contending for the wireless medium. For example, the HE access point 102 may perform a distributed coordination function (DCF). The HE access point 102 may perform a CCA by sensing the medium for a DCF interframe space (DIFS), and if the medium is idle for DIFS, then the HE access point 102 will determine the HE access point 102 may transmit.

The method 700 continues at operation 774 with transmitting MU-RTS 710. The MU-RTS 710 may be carried in a PPDU which is not a HE PPDU. The MU-RTS 710 may be an MU-RTS 400 in accordance with some embodiments.

The MU-RTS 710 may include a user ID 416 for each HE station 104.1 through HE station 104.N and 20 MHz channels 452. The MU-RTS 710 may include an indication for whether the HE stations 104 should perform virtual and/or physical carrier sense. In some embodiments, a CS required 460 field is included in the MU-RTS 710, which may indicate the HE stations 104 are to perform both a virtual and physical carrier sense.

The method 700 continues at operation 776 with the HE stations 104 determining whether to transmit a CTS 712. For example, if CS required 460 is set, then the HE stations 104 may perform a CCA for each 20 MHz channel indicated in the 20 MHz channels 452, and may perform a virtual or NAV checking of each 20 MHz channel indicated in the 20 MHz channels 452.

The method 700 continues at operation 778 with HE stations 104 transmitting CTSs 712 on 20 MHz channels indicated in 20 MHz channels 452 unless the HE station 104 is to perform a physical or virtual channel check and the 20 MHz channel is indicated as busy and the HE station 104 cannot ignore the indication that the channel is busy (e.g., if the 20 MHz channel is busy due to an overlapping BSS and the HE station 104 can reduce its TXP below which the busy may be ignored.) The CTSs 712 may be NDP-CTSs 200, 300 as described in conjunction with FIGS. 2-4.

In some embodiments, one or more wireless communication standards may indicate a procedure for NAV and/or CAA checking so that the MU-RTS 710 may not include an indication for NAV and/or CCA checking. In some embodiments, the NAV and/or CCA checking may be communicated to the HE stations 104 in an information element, e.g., in a beacon frame (not illustrated).

Figure 8:
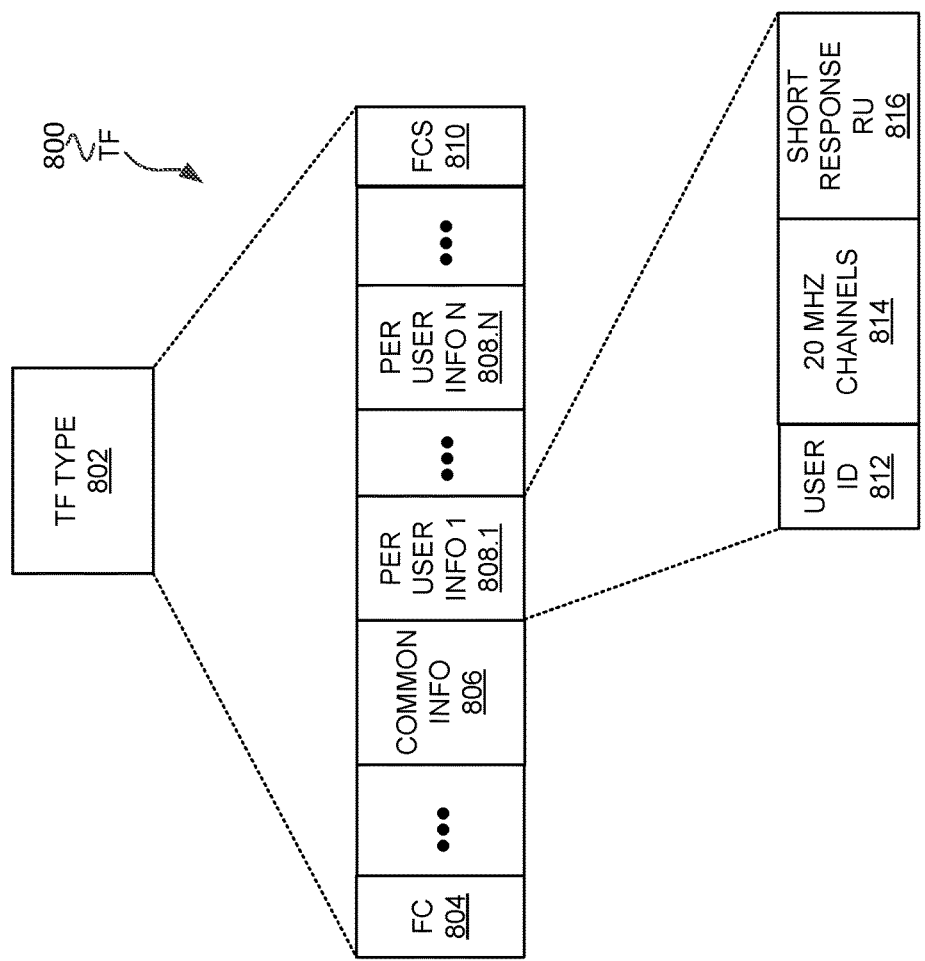
FIG. 8 illustrates a trigger frame (TF) in accordance with some embodiments.

Optionally, the method 700 may continue at operation 780 with the HE access point 104 checking if there are CTS responses to MU-RTS. The method 700 continues at operation 782 with the HE access point 102 transmitting a TF 714. The TF 714 may be a TF 800 as disclosed in conjunction with FIG. 8. FIGS. 7 and 8 are disclosed in conjunction with one another. FIG. 8 illustrates a trigger frame (TF) 800 in accordance with some embodiments. The TF 800 may include a TF type 802, FC 804, common information 806, per user information 1 808.1 through per user information N 808.n, and FCS 810.

The TF type 802 may indicate a type of TF, e.g., a TF for CTS responses. The TF type 802 may be indicated as a portion of FC 804, in accordance with some embodiments. The TF type 802 may be indicated in another field of the TF 800 in accordance with some embodiments. The FC 804 may include information indicating the type of frame, e.g., MU-RTS, a protocol version (e.g., IEEE 802.11ax), type of frame, trigger frame for CTS responses, etc.

The common information 806 may include information that is common to the HE stations 104. The common information 806 may include information for decoding the TF 800 or decoding subsequent frames. The common information 806 may include information for encoding frames to the HE access point 102 as well as information regarding the TXOP, e.g., what frames the HE stations 102 are to encode. The per user info 808 may include user ID 812, 20 MHz channels 814, and short response RU 816, as well as other fields. The 20 MHz channels 814 may be indications of 20 MHz channels for which the short response RUs 816 apply. In some embodiments, the 20 MHz channels 814 field is not included in the per user info 808. In some embodiments, the HE station 104 determines the 20 MHz channels 814 based on which 20 MHz channels are part of the transmission of the MU-RTS 710. The short response RU 816 may be a bandwidth and/or code for the HE station 104 to transmit where the HE station 104 is identified by the user ID 812. In some embodiments, the short response RU 816 indicates a 20 MHz channel of which the short response RU 816 is part. The short response RU 816 may be a short response RU 454 in accordance with some embodiments. In some embodiments, the 20 MHz channels 814 may be a 20 MHz channel 452 in accordance with some embodiments. In some embodiments, the short response RUs 816 are in the MU-RTS 710. The short response RU 816 may indicate a resource unit within a 20 MHz channel and the 20 MHz channel or channels are determined based on a bandwidth of the MU-RTS 710. For example, the short response RU 816 may be an indication of an OFDMA resource unit (e.g., 2 tones and a position of the 2 tones within a 20 MHz channel), and the 20 MHz channel to for the short response RU 816 may be determined based on the MU-RTS 710, e.g., if the MU-RTS 710 was transmitted on an 80 MHz bandwidth and location, then the HE station 104 may determine the 20 MHz channel for each short response RU 816 based on the 80 MHz bandwidth and location.

The method 700 continues at operation 784 with the HE stations 104 determining whether to transmit short feedback responses 716. For example, the HE station 104 may not perform a channel access procedure, or perform a NAV and/or CCA on each 20 MHz channels indicated in the 20 MHz channels 814. The HE stations 104 may perform the same operation at operation 784 as the HE station 104 performed at operation 776 for each of the 20 MHz channels indicated in the 20 MHz channels 814. In some embodiments, the HE stations 104 only perform the same operations at operation 784 for a 20 MHz channel indicated in the 20 MHz channels 814 if a CTS 712 was transmitted by the HE station 104 on that 20 MHz channel.

The method may continue at operation 788 with the HE access point 102 determining responses 727 where the HE access point 102 determines which HE stations 104 transmitted CTSs 712 on which 20 MHz channels.

In some embodiments, a HE station 104 may determine which 20 MHz channels the HE station 104 transmitted a CTS 712 response on. The method 700 continues at operation 786 with the HE stations 104 transmitting short feedback responses 716 in accordance with the short response RUs 816. The short feedback response 716 may be the response indication 652 as illustrated in conjunction with FIG. 6, e.g., a HE-STF 622 and HE-LTF 624. In some embodiments, the short feedback response 716 is a NDP. In some embodiments, the short feedback response 716 is transmitted in accordance with OFDMA and/or MU-MIMO. In some embodiments, the short feedback responses 716 may be different, e.g., only HE-STF 622, only HE-LTF 624, one or more tones being transmitted, a pattern of tones, a time code such as a portion (e.g., one eighth) of the duration of the transmission of a tone, a combination of a time code and one or more tones, etc.

In some embodiments, a HE station 104 may transmit in accordance with the short response RUs 816 if the HE station 104 transmitted a CTS 712 on a 20 MHz channel that includes the short response RUs 816. In some embodiments, a HE station 104 may transmit in accordance with the short response RUs 816 if the HE station 104 transmitted a CTS 712 on a 20 MHz channel that corresponds to the short response RUs 816. For example, the short response RUs 816 may be on a primary channel and the HE station 104 may be allocated four short response RUs 816 (all on the primary channel) corresponding to four different 20 MHz channels. In some embodiments, the HE station 104 determines which short response RU 816 corresponds to a 20 MHz based on a common mapping, e.g., a first short response RU 816 corresponds to a lower 20 MHz channel and a second short response RU 816 corresponds to an upper 20 MHz channel (e.g., a primary or secondary 40 MHz channel).

Continuing with the example, in accordance with some embodiments, the HE station 104 is configured transmit on energy on each of the four short response RUs 816 corresponding to 20 MHz channels the HE station 104 transmitted a CTS 712. In some embodiments, a HE station 104 is configured to transmit on a single short response 816 allocated by the HE access point 102 if the HE station 104 transmitted any CTSs 712. In some embodiments, the HE access point 102 is configured to allocate a short response 816 for each CTS 712 the HE station 104 may determine to transmit on, and one extra short response 816 for the HE station 104 to transmit on for the HE station 104 to indicate to the HE access point 102 that it received the MU-RTS 710. The HE station 104 may determine which 20 MHz channels it is to consider transmitting a CTS 712 based on a bandwidth of the MU-RTS 710. For example, the MU-RTS 710 may be transmitted on a 80 MHz bandwidth and the HE station 104 then determines that it should consider four 20 MHz channels of the 80 MHz bandwidth, e.g., it may transmit on the four 20 MHz channels regardless of a CCA and NAVs or the HE station 104 may consider one or both of the NAVs.

In some embodiments, the HE stations 104 determine a 20 MHz channel to transmit the short response 816 on based on a bandwidth the MU-RTS 710. For example, the MU-RTS 710 may be 80 MHz and the short response RUs 816 may only indicate a location within a 20 MHz channel, e.g., a subchannel such as one ninth of the 20 MHz channel or a number of subcarriers, etc. The HE station 104 will then provide feedback on whether it transmitted a CTS 712 on the 20 MHz channels that are part of the MU-RTS 710 transmission on the corresponding 20 MHz channel, e.g., if the HE station 104 transmitted on an upper primary 20 MHz channel (part of the MU-RTS 710 transmission), then the HE station 104 may transmit on this upper primary 20 MHz channel with the short response RU 816. In some embodiments, the short response RUs 816 may be part of multiple 20 MHz channels that may be different than 20 MHz channels that the CTSs 712 are to be transmitted on.

The CTS 712 may be a MAC portion of a PPDU, e.g., non-HT PPDU, HT PPDU, VHT PPDU, or HE PPDU. In some embodiments, the CTS 712 is not carried in a HE PPDU. In some embodiments, the CTS 712 is a frame format that is indicated in a PHY portion of the frame.

Some embodiments are able to transmit CTSs 712 that can be decoded by non-HT, HT, VHT, and/or HE wireless devices since the CTSs 712 may be carried in a non-HT PPDU, HT PPDU, VHT PPDU, or HE PPDU.

In some embodiments, a phase 1 790 includes operation 774 and operation 770, and a phase 2 792 includes operation 714 and operation 716.

Figure 9:
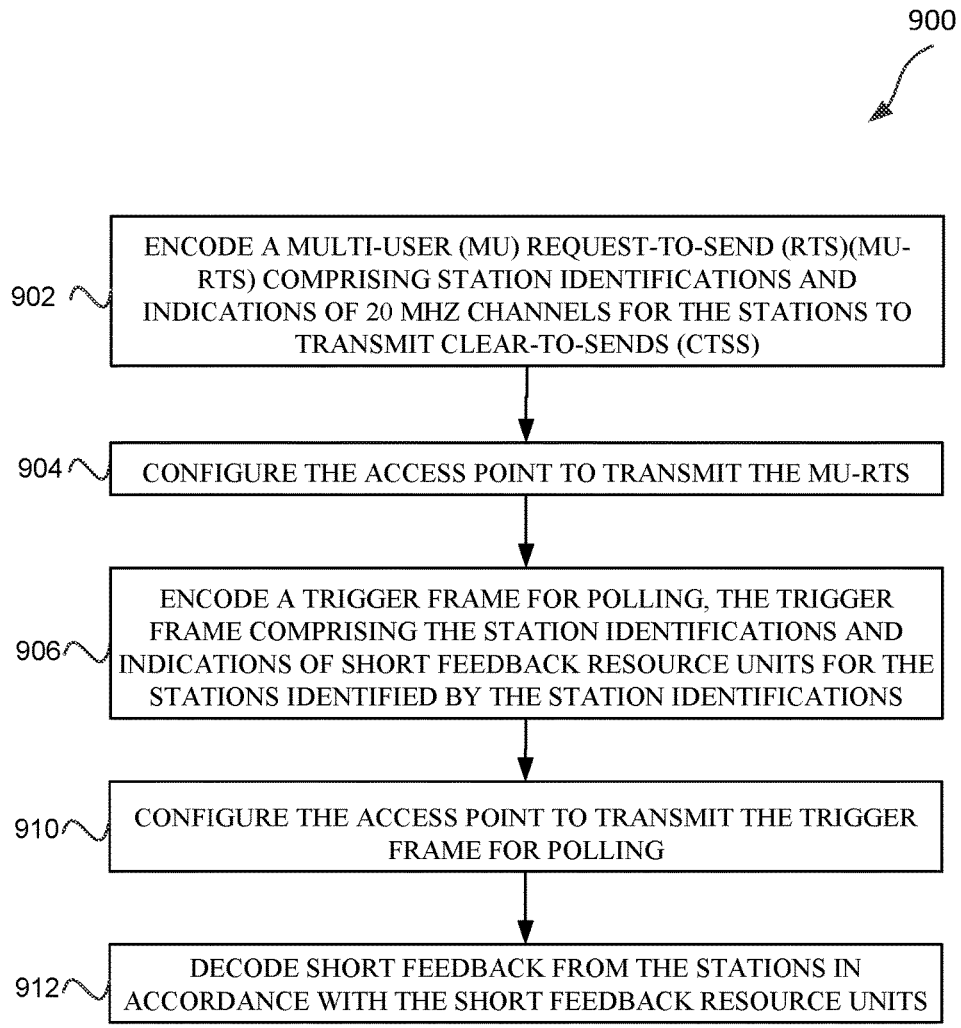
FIG. 9 illustrates a method for MU-RTS in accordance with some embodiments.

FIG. 9 illustrates a method 900 for MU-RTS in accordance with some embodiments. The method 900 begins at operation 902 with encoding a MU-RTS comprising station identifications and indications of 20 MHz channels for the stations to transmit clear-to-sends (CTSs). For example, HE access point 102 may encode MU-RTS 710 as disclosed in conjunction with FIG. 7.

The method 900 continues at operation 904 with configuring the access point to transmit the MU-RTS. For example, an apparatus of the HE access point 102 may configure the HE access point 102 to transmit the MU-RTS 710.

The method 900 begins at operation 906 with encoding a trigger frame for polling, the trigger frame comprising the station identifications and indications of short feedback resource units for the stations identified by the station identifications. For example, HE access pint 102 may encode TF 714 as disclosed in conjunction with FIG. 7.

The method 900 may continue at operation 908 with configuring the access point to transmit the trigger frame for polling. For example, an apparatus of the HE access point 102 may configure the HE access point 102 to transmit the TF 714.

The method 900 may continue at operation 910 with decoding short feedback from the stations in accordance with the short feedback resource units. For example, HE access point 102 may decode short feedback responses 716. One or more of the operations above may be performed by an apparatus of a HE access point 102.

Figure 10:
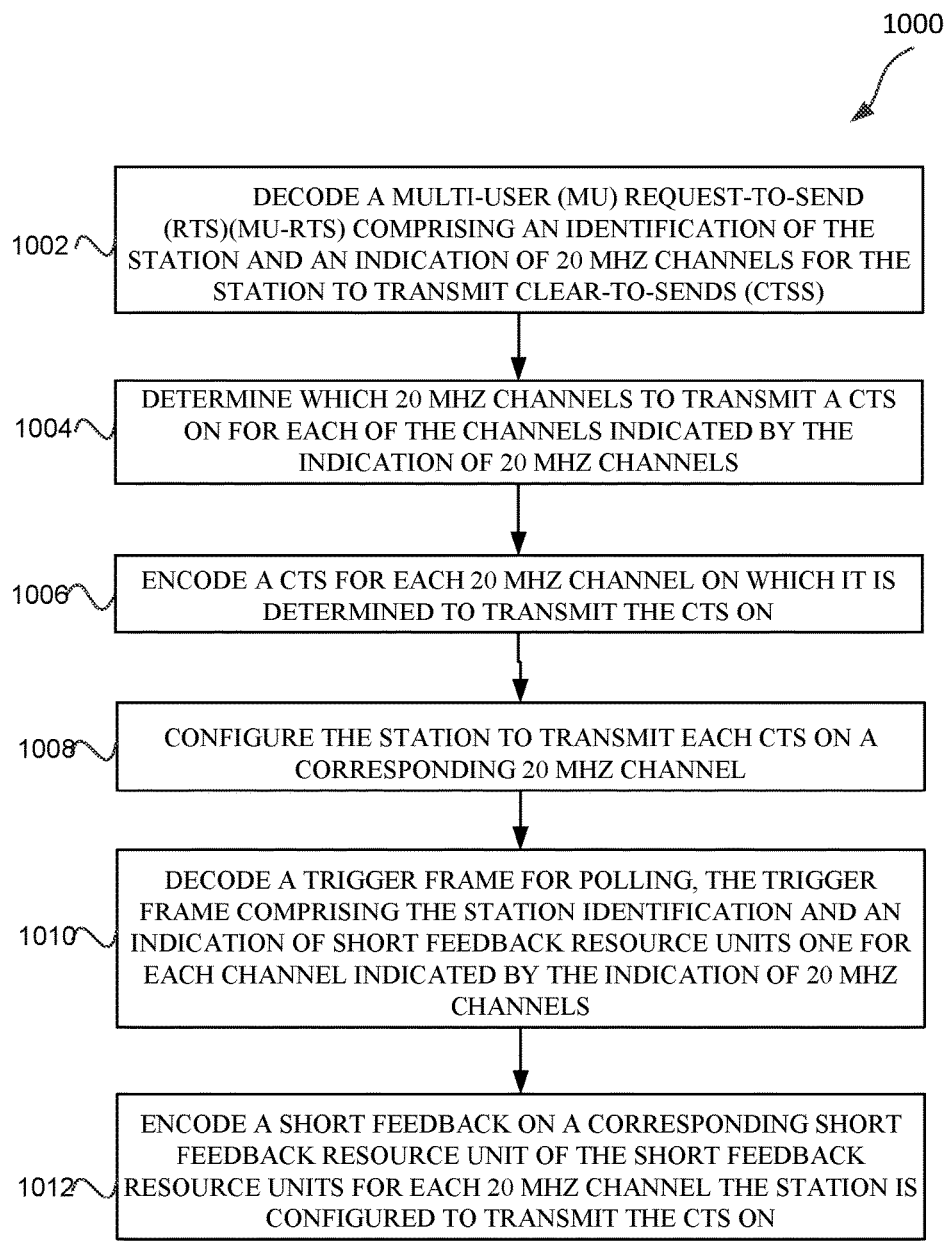
FIG. 10 illustrates a method for MU-RTS in accordance with some embodiments.

FIG. 10 illustrates a method 1000 for MU-RTS in accordance with some embodiments. The method 1000 may begin at operation 1002 with decoding a MU-RTS comprising an identification of the station and an indication of 20 MHz channels for the station to transmit clear-to-sends (CTSs). For example, HE stations 104.1 through HE stations 104.N may decode MU-RTS 710.

The method 1000 may continue at operation 1004 with determining which 20 MHz channels to transmit a CTS on for each of the channels indicated by the indication of 20 MHz channels. For example, HE stations 104.1 through HE stations 104.N may perform operation 776 of FIG. 7 as described in conjunction with FIG. 7.

The method 1000 may continue at operation 1006 with encoding a CTS for each 20 MHz channel on which it is determined to transmit the CTS on. For example, HE stations 104.1 through HE stations 104.N may determine which frequencies 706 to transmit a CTS 712 on of 20 MHz channels 452.

The method 1000 may continue at operation 1008 with configuring the station to transmit each CTS on a corresponding 20 MHz channel. For example, an apparatus of the HE stations 104.1 through HE stations 104.N may configure the corresponding HE stations 104.1 through HE stations 104.N to transmit a CTS 712 on the 20 MHz channels that the HE stations determine to transmit on.

The method 1000 may continue at operation 1010 with decoding a trigger frame for polling, the trigger frame comprising the station identification and an indication of a short feedback resource unit. For example, HE stations 104.1 through HE stations 104.N may decode TF 714, which may include short response RU 816.

In some embodiments, operation 1010 may comprise decoding a trigger frame for polling, the trigger frame comprising the station identification and an indication of short feedback resource units one for each channel indicated by the indication of 20 MHz channels. For example, HE stations 104.1 through HE stations 104.N may decode TF 714, which may include 20 MHz channels 814 and short response RU 816 for each 20 MHz channel.

The method 1000 may continue at operation 1012 with encoding short feedback on the short feedback resource unit to indicate whether one or more of the CTSs are transmitted. For example, HE stations 104.1 through HE stations 104.N may encode short feedback response 716 to indicate the transmission of one or more CTSs 712.

The method 1000 may continue at operation 1012 with encoding a short feedback on a corresponding short feedback resource unit of the short feedback resource units for each 20 MHz channel the station is configured to transmit the CTS on and. For example, HE stations 104.1 through HE stations 104.N may encode short feedback responses 716 as described in conjunction with FIG. 7.

The method 1000 may continue with configuring the station to transmit each CTS on a corresponding 20 MHz channel. For example, an apparatus of each of HE stations 104.1 through HE stations 104.N may configure the corresponding HE station 104 of HE stations 104.1 through HE stations 104.N to transmit the encoded short feedback responses 716. An apparatus of an HE station 104 may perform one or more of the operations above.

Figure 11:
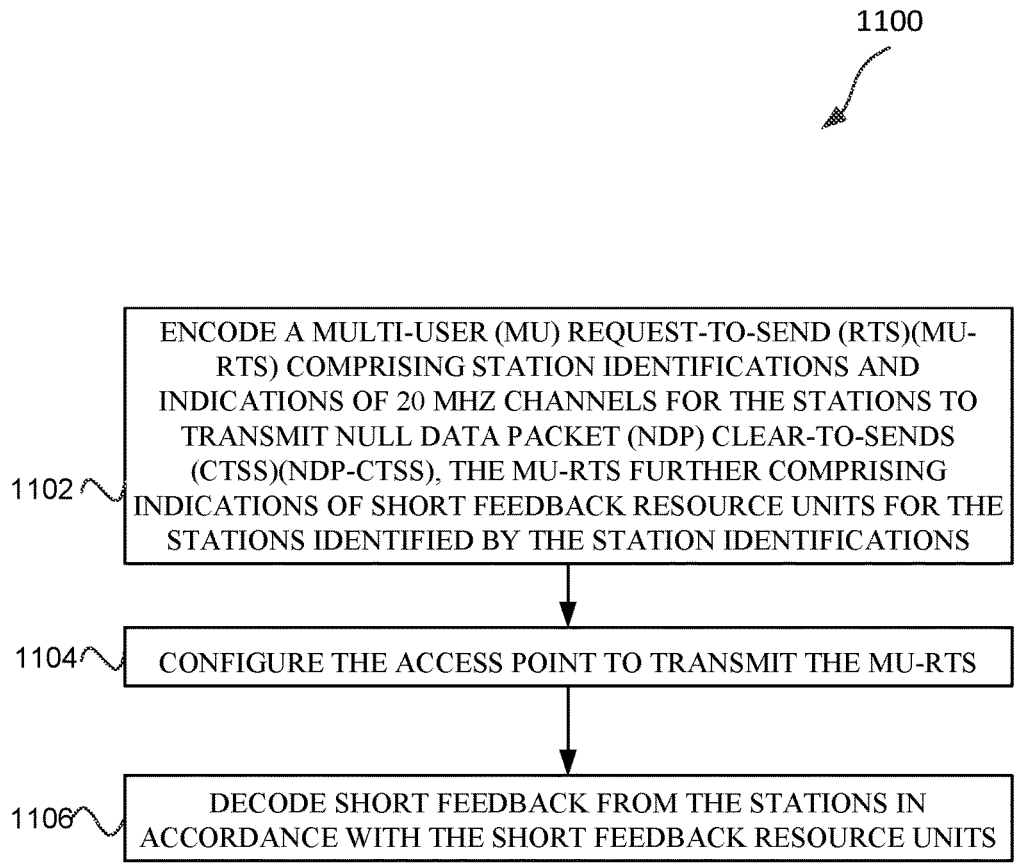
FIG. 11 illustrates a method for MU-RTS in accordance with some embodiments.

FIG. 11 illustrates a method 1100 for MU-RTS in accordance with some embodiments. The method 1100 begins at operation 1102 with encoding a MU-RTS comprising station identifications and indications of 20 MHz channels for the stations to transmit NDP-CTSs, the MU-RTS further comprising indications of short feedback resource units for the stations identified by the station identifications.

For example, HE access point 102 may encode MU-RTS 610 as described in conjunction with FIG. 6.

The method 1100 continues at operation 1104 with configuring the access point to transmit the MU-RTS. For example, an apparatus of the HE access point 102 may configure the HE access point 102 to transmit MU-RTS 610.

The method 1100 continues at operation 1106 with decoding short feedback from the stations in accordance with the short feedback resource units. For example, HE access point 102 may decode determine responses 626 as described in conjunction with FIG. 6. In some embodiments, an apparatus of the HE access point 102 may perform one or more of the operations above.

Figure 12:
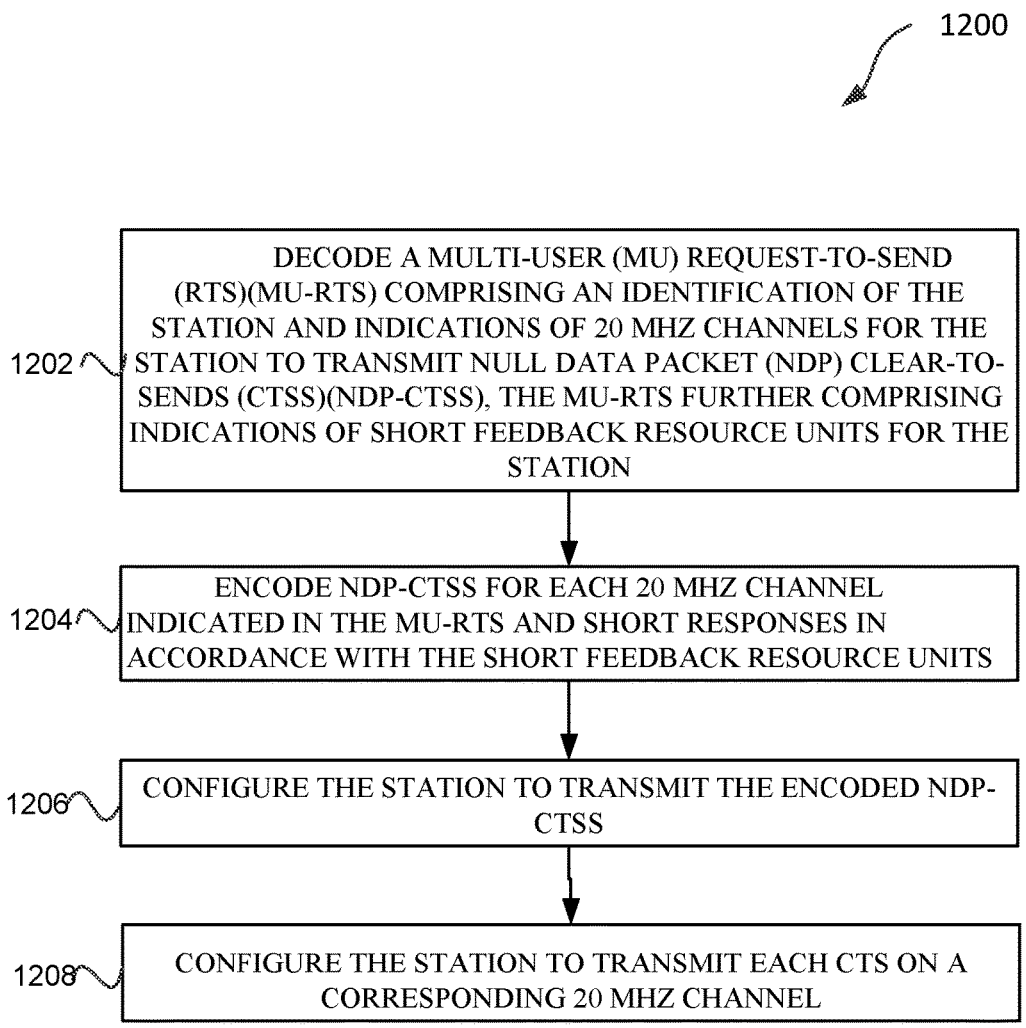
FIG. 12 illustrates a method for MU-RTS in accordance with some embodiments.

FIG. 12 illustrates a method 1200 for MU-RTS in accordance with some embodiments. The method 1200 begins at operation 1200 with decoding a MU-RTS comprising an identification of the station and indications of 20 MHz channels for the station to transmit NDP-CTSs, the MU-RTS further comprising indications of short feedback resource units for the station. For example, HE station 104.1 may decode MU-RTS 610 as disclosed in conjunction with FIG. 6.

The method 1200 continues at operation 1204 with encoding NDP-CTSs for each 20 MHz channel indicated in the MU-RTS and short responses in accordance with the short feedback resource units. For example, HE station 104.1 may encode NDP-CTS 650 and response indication 652 as described in conjunction with FIG. 6 for each 20 MHz channel that HE station 104.1 is to transmit on, e.g., 20 MHz channels, but may be fewer if CS required 460 is set and a 20 MHz channel is busy (CCA and/or NAV).

The method 1200 may continue at operation 1206 with configuring the station to transmit the encoded NDP-CTS. For example, an apparatus of HE station 104.1 may configure HE station 104.1 to transmit NDP-CTS 650 and response indication 652.

In some embodiments, the method 1200 include the operation of performing a CCA and/or checking NAVs to determine whether to transmit on each 20 MHz channel indicated in the MU-RTS, and if the 20 MHz channel is determined to be busy then not encoding an NDP-CTS for that 20 MHz channel. In some embodiments, an apparatus of the HE station 104 may perform one or more of the operations above.

Figure 13:
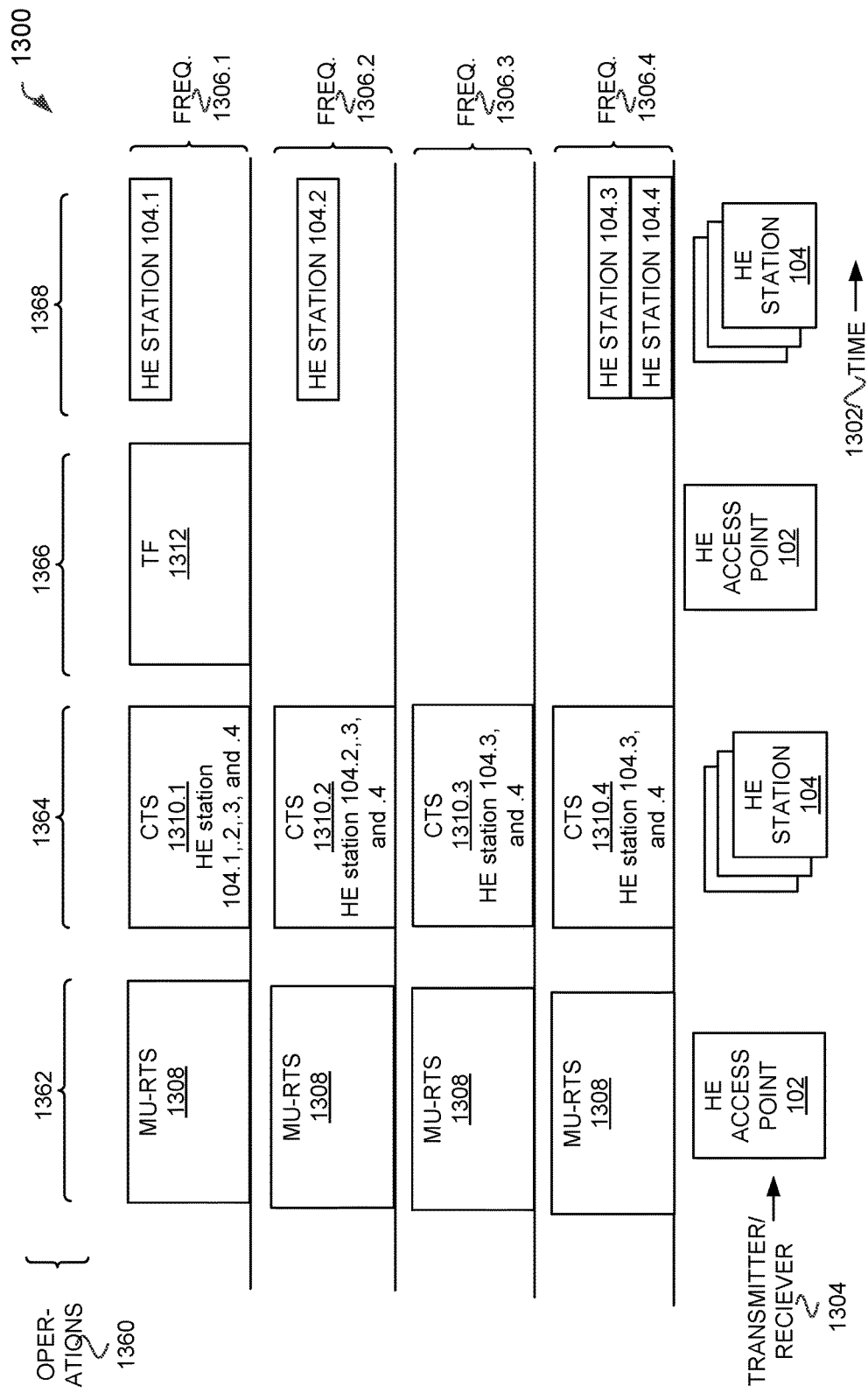
FIG. 13 illustrates a method for MU-RTS in accordance with some embodiments.

FIG. 13 illustrates a method 1300 for MU-RTS in accordance with some embodiments. Illustrated in FIG. 13 is time 1302 along a horizontal axis, frequency 1306 along a vertical axis, transmitter/receiver 1304 along the bottom, and operations 1360 along the top.

The frequencies 1306 may indicate channels, e.g., each frequency 1306 may be 20 MHz channel. Four frequencies 1306 are illustrated, but there may be more or fewer frequencies 1306, e.g., there may be eight 20 MHz channels.

The method 1300 begins at operation 1362 with the HE access point 102 transmitting MU-RTS 1308. The MU-RTS 1308 may be transmitted with a bandwidth over all the frequencies 1306. In some embodiments, the MU-RTS 1308 may be transmitted on only one 20 MHz channel, e.g., frequency 1306.1.

The MU-RTS 1308 may be an MU-RTS 710 as described in conjunction with FIG. 7. The MU-RTS 1308 may be an MU-RTS 400 as described in conjunction with FIG. 4. As illustrated, the MU-RTS 1308 includes 20 MHz channels 452 (FIG. 4) of frequency 1306.1 for HE station 104.1, frequency 1306.1 and 1306.2 for HE station 104.2, and frequency 1306.1, 1306.2, 1306.3, and 1306.4 for HE stations 104.3 and 104.4.

The method 1300 continues at operation 1364 with the HE stations 104 transmitting CTSs 1310 on the frequencies 1306. For example, the HE stations 104 may transmit in accordance with the 20 MHz channels 452 as disclosed above. The HE stations 104 may have been required to check the CCA and/or NAV, but in this case all the frequencies 1306 were clear, so each HE station 104 transmitted a CTS on a frequency 1306 that was included in the 20 MHz channels 452. HE station 104.1 transmitted on frequency 1306.1 (e.g., CTS 1310.1). HE station 104.2 transmitted on frequencies 1306.1 and 1306.2 (e.g., CTSs 1310.1 and 1310.2). HE station 104.3 transmitted on frequencies 1306.1, 1306.2, 1306.3, and 1306.4 (e.g., CTSs 1310.1, 1310.2, 1310.3, and 1310.4). HE station 104.4 transmitted on frequencies 1306.1, 1306.2, 1306.3, and 1306.4 (e.g., CTSs 1310.1, 1310.2, 1310.3, and 1310.4).

The method 1300 continues at operation 1366 with the HE access point 102 transmitting a TF 1312. The TF 1312 may be a TF 800 as disclosed in conjunction with FIG. 8. TF 1312 may be a TF 714 as disclosed in conjunction with FIG. 7.

The TF 1312 may include only short response RU 816 for each of the HE stations 104. The one short response RU 816 may be on a last frequency 1306 of the 20 MHz channels 452. For example, the short response RU 816 may be on a frequency 1306 with the higher radio frequency. In some embodiments, the frequencies 1306 may be a primary lower 20 MHz channel (frequency 1306.1) a primary upper 20 MHz channel (frequency 1306.2), a secondary lower 20 MHz channel (frequency 1306.3), and a secondary upper 20 MHz channel (frequency 1306.4). The frequencies 1306 may be ordered from 1 to 4, and the short response RU 816 for a HE station 104 may be on the frequency with the highest number where the HE station 104 was allocated in 20 MHz channels 452. In some embodiments, the short response RU 816 may be in one or two channels such as frequency 1306.1 and frequency 1306.3.

The method 1300 continues at operation 1368 with the HE stations 104 transmitting short responses in accordance with the short response RUs 816. For example, HE station 104.2 transmits on the one short response RU 816 that HE station 104.2 was allocated to indicate that HE station 104.2 transmitted a CTS 1310 on each of the channels (frequencies 1306) that was indicated in the 20 MHz channels 452. The HE access point 102 may determine which HE stations 104 have free channels to transmit data to the HE stations 104 to, based on the short responses of operation 1368. In some embodiments, where the short response RUs 816 not all in the last channel of the 20 MHz channels 452 for the HE stations 104, the short responses may all be on one or two (or more if needed) frequencies 1306. For example, all the short responses of operation 1368 may be on frequency 1306.1.

Figure 14:
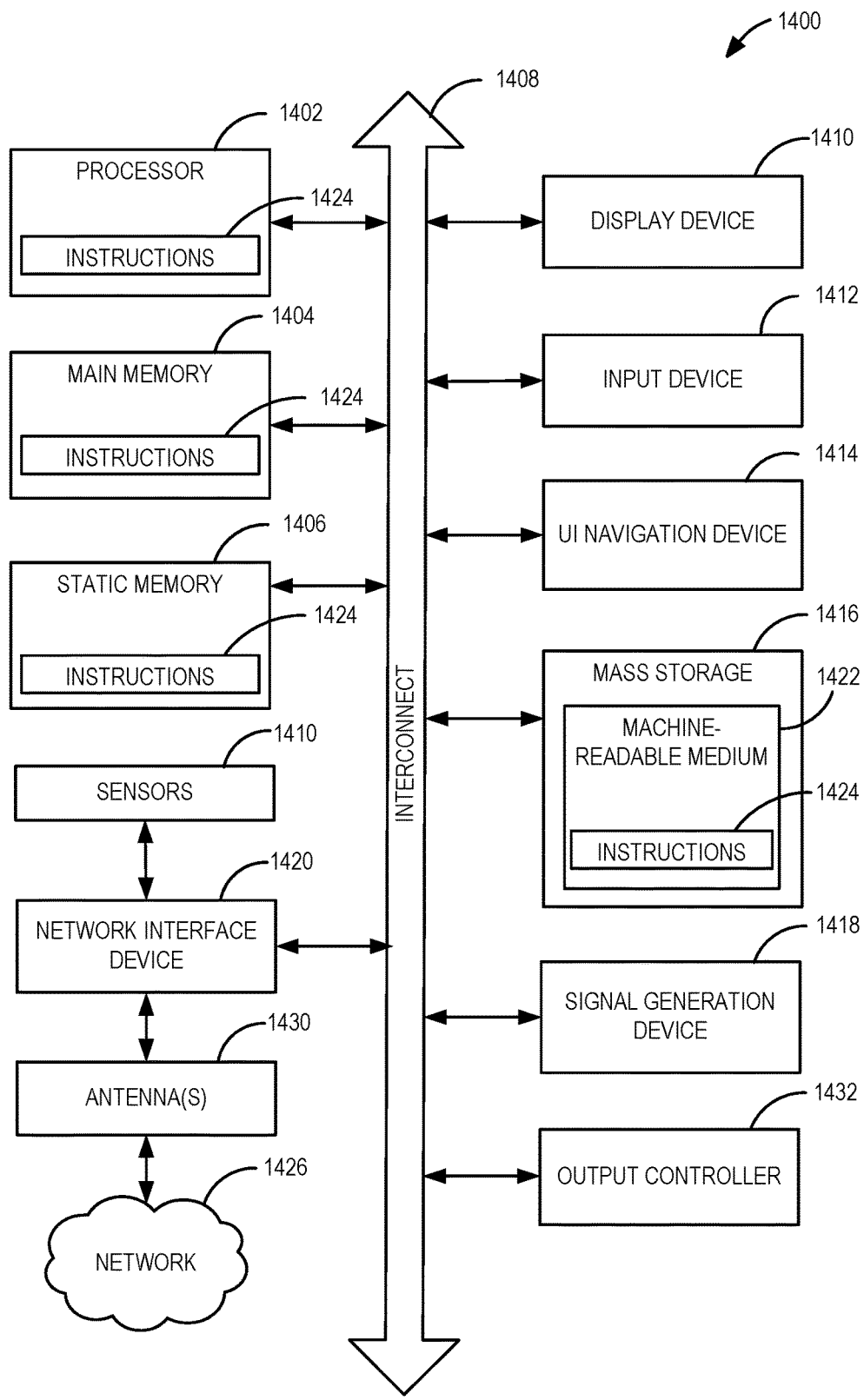
FIG. 14 illustrates a block diagram of an example machine 1300 upon which any one or more of the techniques (e.g., methodologies) discussed herein may perform.

FIG. 14 illustrates a block diagram of an example machine 1400 upon which any one or more of the techniques (e.g., methodologies) discussed herein may perform. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a HE access point 102, HE station 104, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408.

Specific examples of main memory 1404 include Random Access Memory (RAM), and semiconductor memory devices, which may include, in some embodiments, storage locations in semiconductors such as registers. Specific examples of static memory 1406 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1400 may further include a display device 1410, an input device 1412 (e.g., a keyboard), and a user interface (UI) navigation device 1414 (e.g., a mouse). In an example, the display device 1410, input device 1412 and UI navigation device 1414 may be a touch screen display. The machine 1400 may additionally include a mass storage (e.g., drive unit) 1416, a signal generation device 1418 (e.g., a speaker), a network interface device 1420, and one or more sensors 1421, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1402 and/or instructions 1424 may comprise processing circuitry and/or transceiver circuitry.

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1422 is illustrated as a single medium, the term "machine readable medium" may include a single medium or multiple media (e.g., a centralized or distributed database, and/or associated caches and servers) configured to store the one or more instructions 1424.

An apparatus of the machine 1400 may be one or more of a hardware processor 1402 (e.g., a central processing unit (CPU), a graphics processing unit (GPU), a hardware processor core, or any combination thereof), a main memory 1404 and a static memory 1406, sensors 1421, network interface device 1420, antennas 1460, a display device 1410, an input device 1412, a UI navigation device 1414, a mass storage 1416, instructions 1424, a signal generation device 1418, and an output controller 1428. The apparatus may be configured to perform one or more of the methods and/or operations disclosed herein. The apparatus may be intended as a component of the machine 1400 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1424 may further be transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1420 may include one or more physical jacks (e.g., Ethernet, coaxial, or phone jacks) or one or more antennas to connect to the communications network 1426. In an example, the network interface device 1420 may include one or more antennas 1460 to wirelessly communicate using at least one of single-input multiple-output (SIMO), multiple-input multiple-output (MIMO), or multiple-input single-output (MISO) techniques. In some examples, the network interface device 1420 may wirelessly communicate using Multiple User MIMO techniques. The term "transmission medium" shall be taken to include any intangible medium that is capable of storing, encoding or carrying instructions for execution by the machine 1400, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of an access point including: a memory; and processing circuitry couple to the memory, where the processing circuitry is configured to: encode a multi-user (MU) request-to-send (RTS) (MU-RTS) including station identifications of stations and indications of 20 MHz channels for the stations to transmit clear-to-sends (CTSs); configure the access point to transmit the MU-RTS; encode a trigger frame for polling including the station identifications and indications of short feedback resource units for the stations; configure the access point to transmit the trigger frame for polling; and decode short feedback from the stations in accordance with the indications of the short feedback resource units, where the short feedback is in response to the trigger frame for polling and the MU-RTS.

In Example 2, the subject matter of Example 1 optionally includes where the processing circuitry is further configured to: determine which stations of the stations transmitted a CTS on which 20 MHz channels of 20 MHz channels indicated by the indications of 20 MHz channels based on the short feedback from the stations.

In Example 3, the subject matter of Example 2 optionally includes where the processing circuitry is further configured to: determine a station transmitted a CTS in response to the MU-RTS on a 20 MHz channel if short feedback is received from the station on the 20 MHz channel.

In Example 4, the subject matter of any one or more of Examples 2-3 optionally include wherein each station of the stations is allocated one short feedback resource unit and if short feedback is received on the one short feedback resource unit, it indicates that the each station has transmitted a CTS on each 20 MHz channel of the 20 MHz channels, and wherein the one short feedback resource unit is in a last 20 MHz channel or another 20 MHz channel of the 20 MHz channels.

In Example 5, the subject matter of any one or more of Examples 1-4 optionally include MHz channels and an orthogonal frequency division multiple-access (OFDMA) resource unit.

In Example 6, the subject matter of Example 5 optionally includes MHz channel, a time division of one or more subcarriers, and a spatial stream resource unit.

In Example 7, the subject matter of any one or more of Examples 1-6 optionally include MHz channel, and where short resource units indicated by the indications of short resource units are orthogonal frequency division multiple-access (OFDMA) resource units.

In Example 8, the subject matter of Example 7 optionally includes MHz channel for the short feedback is indicated by a bandwidth of the trigger frame for polling.

In Example 9, the subject matter of any one or more of Examples 7-8 optionally include MHz channel, a time division of one or more subcarriers, and a spatial stream.

In Example 10, the subject matter of any one or more of Examples 1-9 optionally include where the processing circuitry is further configured to: encode the MU-RTS to further comprise an indication that the CTSs are to be null data packet (NDP) CTSs.

In Example 11, the subject matter of any one or more of Examples 1-10 optionally include where the processing circuitry is further configured to: encode the MU-RTS to further comprise an indication of whether the stations are to perform carrier sensing before transmitting the CTSs, and not transmit the CTSs if the carrier sensing indicates a 20 MHz channel is busy.

In Example 12, the subject matter of Example 11 optionally includes where the carrier sensing comprises a physical carrier sensing and a virtual carrier sensing, the virtual carrier sensing based on one or more network allocation vectors.

In Example 13, the subject matter of any one or more of Examples 1-12 optionally include ax station.

In Example 14, the subject matter of any one or more of Examples 1-13 optionally include transceiver circuitry coupled to the memory; and, one or more antennas coupled to the transceiver circuitry.

Example 15 is a non-transitory computer-readable storage medium that stores instructions for execution by one or more processors, the instructions to configure the one or more processors to cause an apparatus of an access point to: encode a multi-user (MU) request-to-send (RTS) (MU-RTS) including station identifications and indications of 20 MHz channels for the stations to transmit null data packet (NDP) clear-to-sends (CTSs) (NDP-CTSs), the MU-RTS further including indications of short feedback resource units for the stations identified by the station identifications; configure the access point to transmit the MU-RTS; and decode short feedback from the stations in accordance with the short feedback resource units, where the short feedback is in response to the MU-RTS.

In Example 16, the subject matter of Example 15 optionally includes MHz channels.

In Example 17, the subject matter of any one or more of Examples 15-16 optionally include MHz channels the MU-RTS is transmitted on.

In Example 18, the subject matter of any one or more of Examples 15-17 optionally include MHz channels.

In Example 19, the subject matter of any one or more of Examples 15-18 optionally include where the short feedback resource units further indicate one or more of a spatial stream and a time division of the one or more sub-carriers.

In Example 20, the subject matter of any one or more of Examples 15-19 optionally include MHz channels and an orthogonal frequency division multiple-access (OFDMA) resource unit.

In Example 21, the subject matter of any one or more of Examples 15-20 optionally include MHz channels for the short feedback resource units are determined from a corresponding OFDMA resource unit and a bandwidth of the trigger frame for polling.

In Example 22, the subject matter of any one or more of Examples 15-21 optionally include where the short feedback resource units begin in time after the stations transmit the NDP-CTSs.

Example 23 is a method performed by an apparatus of an access point, the method including: encoding a multi-user (MU) request-to-send (RTS) (MU-RTS) including station identifications and indications of 20 MHz channels for the stations to transmit clear-to-sends (CTSs); configuring the access point to transmit the MU-RTS; encoding a trigger frame for polling, the trigger frame including the station identifications and indications of short feedback resource units for the stations identified by the station identifications; configuring the access point to transmit the trigger frame for polling; and decoding short feedback from the stations in accordance with the short feedback resource units.

In Example 24, the subject matter of Example 23 optionally includes the method further including: determining which stations of the stations transmitted a CTS on which 20 MHz channels of the 20 MHz channels based on the short feedback from the stations.

Example 25 is an apparatus of a station including: a memory; and processing circuitry couple to the memory, where the processing circuitry is configured to: decode a multi-user (MU) request-to-send (RTS) (MU-RTS) including an identification of the station and an indication of 20 MHz channels for the station to transmit clear-to-sends (CTSs); determine which 20 MHz channels to transmit a CTS on for each of the channels indicated by the indication of 20 MHz channels; encode a CTS for each 20 MHz channel on which it is determined to transmit the CTS on; configure the station to transmit each CTS on a corresponding 20 MHz channel; decode a trigger frame for polling, the trigger frame including the station identification and an indication of a short feedback resource unit; and encode short feedback on the short feedback resource unit to indicate whether one or more of the CTSs are transmitted.

In Example 26, the subject matter of Example 25 optionally includes where the processing circuitry is further configured to: encode the short feedback on a corresponding short feedback resource unit of the short feedback resource units for each 20 MHz channel the station is configured to transmit the CTS on.

In Example 27, the subject matter of any one or more of Examples 25-26 optionally include MHz channels, and where the processing circuitry is configured to: determine which 20 MHz channels to transmit the CTS on for each of the channels indicated by the indication of 20 MHz channels based on performing a clear channel assessment (CCA) for each of the channels.

In Example 28, the subject matter of any one or more of Examples 25-27 optionally include where the processing circuitry is further configured to: determine which 20 MHz channels to transmit the CTS on for each of the channels indicated by the indication of 20 MHz channels based on performing the CCA for each of the channels and based on one or more network allocation vectors.

Example 29 is a non-transitory computer-readable storage medium that stores instructions for execution by one or more processors, the instructions to configure the one or more processors to cause an apparatus of an access point to: encode a multi-user (MU) request-to-send (RTS) (MU-RTS) including station identifications of stations and indications of 20 MHz channels for the stations to transmit clear-to-sends (CTSs); configure the access point to transmit the MU-RTS; encode a trigger frame for polling including the station identifications and indications of short feedback resource units for the stations; configure the access point to transmit the trigger frame for polling; and decode short feedback from the stations in accordance with the indications of the short feedback resource units, where the short feedback is in response to the trigger frame for polling and the MU-RTS.

In Example 30, the subject matter of Example 29 optionally includes where the instructions further configure the one or more processors to cause the apparatus of the access point to: determine which stations of the stations transmitted a CTS on which 20 MHz channels of 20 MHz channels indicated by the indications of 20 MHz channels based on the short feedback from the stations.

In Example 31, the subject matter of Example 30 optionally includes where the instructions further configure the one or more processors to cause the apparatus of the access point to: determine a station transmitted a CTS in response to the MU-RTS on a 20 MHz channel if short feedback is received from the station on the 20 MHz channel.

In Example 32, the subject matter of any one or more of Examples 30-31 optionally include wherein each station of the stations is allocated one short feedback resource unit and if short feedback is received on the one short feedback resource unit, it indicates that the each station has transmitted a CTS on each 20 MHz channel of the 20 MHz channels, and wherein the one short feedback resource unit is in a last 20 MHz channel or another 20 MHz channel of the 20 MHz channels.

In Example 33, the subject matter of any one or more of Examples 29-32 optionally include MHz channels and an orthogonal frequency division multiple-access (OFDMA) resource unit.

In Example 34, the subject matter of Example 33 optionally includes MHz channel, a time division of one or more subcarriers, and a spatial stream resource unit.

In Example 35, the subject matter of any one or more of Examples 29-34 optionally include MHz channel, and where short resource units indicated by the indications of short resource units are orthogonal frequency division multiple-access (OFDMA) resource units.

In Example 36, the subject matter of any one or more of Examples 29-35 optionally include MHz channel for the short feedback is indicated by a bandwidth of the trigger frame for polling.

In Example 37, the subject matter of any one or more of Examples 29-36 optionally include MHz channel, a time division of one or more subcarriers, and a spatial stream.

In Example 38, the subject matter of any one or more of Examples 29-37 optionally include where the instructions further configure the one or more processors to cause the apparatus of the access point to: encode the MU-RTS to further comprise an indication that the CTSs are to be null data packet (NDP) CTSs.

In Example 39, the subject matter of any one or more of Examples 29-38 optionally include where the instructions further configure the one or more processors to cause the apparatus of the access point to: encode the MU-RTS to further comprise an indication of whether the stations are to perform carrier sensing before transmitting the CTSs, and not transmit the CTSs if the carrier sensing indicates a 20 MHz channel is busy.

In Example 40, the subject matter of any one or more of Examples 29-39 optionally include where the carrier sensing comprises a physical carrier sensing and a virtual carrier sensing, the virtual carrier sensing based on one or more network allocation vectors.

In Example 41, the subject matter of any one or more of Examples 29-40 optionally include ax station.

Example 42 is an apparatus of an access point including: means for encoding a multi-user (MU) request-to-send (RTS) (MU-RTS) including station identifications of stations and indications of 20 MHz channels for the stations to transmit clear-to-sends (CTSs); means for configuring the access point to transmit the MU-RTS; means for encoding a trigger frame for polling including the station identifications and indications of short feedback resource units for the stations; means for configuring the access point to transmit the trigger frame for polling; and means for decoding short feedback from the stations in accordance with the indications of the short feedback resource units, where the short feedback is in response to the trigger frame for polling and the MU-RTS.

In Example 43, the subject matter of Example 42 optionally includes means for determining which stations of the stations transmitted a CTS on which 20 MHz channels of 20 MHz channels indicated by the indications of 20 MHz channels based on the short feedback from the stations.

In Example 44, the subject matter of Example 43 optionally includes means for determining a station transmitted a CTS in response to the MU-RTS on a 20 MHz channel if short feedback is received from the station on the 20 MHz channel.

In Example 45, the subject matter of any one or more of Examples 43-44 optionally where each station of the stations is allocated one short feedback resource unit and if short feedback is received on the one short feedback resource unit, it indicates that the each station has transmitted a CTS on each 20 MHz channel of the 20 MHz channels, and wherein the one short feedback resource unit is in a last 20 MHz channel or another 20 MHz channel of the 20 MHz channels.

In Example 46, the subject matter of any one or more of Examples 42-45 optionally include MHz channels and an orthogonal frequency division multiple-access (OFDMA) resource unit.

In Example 47, the subject matter of Example 46 optionally includes MHz channel, a time division of one or more subcarriers, and a spatial stream resource unit.

In Example 48, the subject matter of any one or more of Examples 42-47 optionally include MHz channel, and where short resource units indicated by the indications of short resource units are orthogonal frequency division multiple-access (OFDMA) resource units.

In Example 49, the subject matter of Example 48 optionally includes MHz channel for the short feedback is indicated by a bandwidth of the trigger frame for polling.

In Example 50, the subject matter of any one or more of Examples 48-49 optionally include MHz channel, a time division of one or more subcarriers, and a spatial stream.

In Example 51, the subject matter of any one or more of Examples 48-50 optionally include means for encoding the MU-RTS to further comprise an indication that the CTSs are to be null data packet (NDP) CTSs.

In Example 52, the subject matter of any one or more of Examples 42-51 optionally include means for encoding the MU-RTS to further comprise an indication of whether the stations are to perform carrier sensing before transmitting the CTSs, and not transmit the CTSs if the carrier sensing indicates a 20 MHz channel is busy.

In Example 53, the subject matter of Example 52 optionally includes where the carrier sensing comprises a physical carrier sensing and a virtual carrier sensing, the virtual carrier sensing based on one or more network allocation vectors.

In Example 54, the subject matter of any one or more of Examples 42-53 optionally include ax station.

In Example 55, the subject matter of any one or more of Examples 42-54 optionally include means for processing radio frequency signals coupled to a means for storing and retrieving data, and means for transmitting and receiving radio frequency signals.

Example 56 is a method performed by an apparatus of an access point, the method including: encoding a multi-user (MU) request-to-send (RTS) (MU-RTS) including station identifications and indications of 20 MHz channels for the stations to transmit null data packet (NDP) clear-to-sends (CTSs) (NDP-CTSs), the MU-RTS further including indications of short feedback resource units for the stations identified by the station identifications; configuring the access point to transmit the MU-RTS; and decoding short feedback from the stations in accordance with the short feedback resource units, where the short feedback is in response to the MU-RTS.

In Example 57, the subject matter of Example 56 optionally includes MHz channels.

In Example 58, the subject matter of any one or more of Examples 56-57 optionally include MHz channels the MU-RTS is transmitted on.

In Example 59, the subject matter of any one or more of Examples 56-58 optionally include MHz channels.

In Example 60, the subject matter of any one or more of Examples 56-59 optionally include where the short feedback resource units further indicate one or more of a spatial stream and a time division of the one or more sub-carriers.

In Example 61, the subject matter of any one or more of Examples 56-60 optionally include MHz channels and an orthogonal frequency division multiple-access (OFDMA) resource unit.

In Example 62, the subject matter of any one or more of Examples 56-61 optionally include MHz channels for the short feedback resource units are determined from a corresponding OFDMA resource unit and a bandwidth of the trigger frame for polling.

In Example 63, the subject matter of any one or more of Examples 56-62 optionally include where the short feedback resource units begin in time after the stations transmit the NDP-CTSs.

Example 64 is an apparatus of an access point including: a memory; and processing circuitry couple to the memory, where the processing circuitry is configured to: encode a multi-user (MU) request-to-send (RTS) (MU-RTS) including station identifications and indications of 20 MHz channels for the stations to transmit null data packet (NDP) clear-to-sends (CTSs) (NDP-CTSs), the MU-RTS further including indications of short feedback resource units for the stations identified by the station identifications; configure the access point to transmit the MU-RTS; and decode short feedback from the stations in accordance with the short feedback resource units, where the short feedback is in response to the MU-RTS.

In Example 65, the subject matter of Example 64 optionally includes MHz channels.

In Example 66, the subject matter of any one or more of Examples 64-65 optionally include MHz channels the MU-RTS is transmitted on.

In Example 67, the subject matter of any one or more of Examples 64-66 optionally include MHz channels.

In Example 68, the subject matter of any one or more of Examples 64-67 optionally include where the short feedback resource units further indicate one or more of a spatial stream and a time division of the one or more sub-carriers.

In Example 69, the subject matter of any one or more of Examples 64-68 optionally include MHz channels and an orthogonal frequency division multiple-access (OFDMA) resource unit.

In Example 70, the subject matter of any one or more of Examples 64-69 optionally include MHz channels for the short feedback resource units are determined from a corresponding OFDMA resource unit and a bandwidth of the trigger frame for polling.

In Example 71, the subject matter of any one or more of Examples 64-70 optionally include where the short feedback resource units begin in time after the stations transmit the NDP-CTSs.

Example 72 is an apparatus of an access point, the apparatus including: means for encoding a multi-user (MU) request-to-send (RTS) (MU-RTS) including station identifications and indications of 20 MHz channels for the stations to transmit null data packet (NDP) clear-to-sends (CTSs) (NDP-CTSs), the MU-RTS further including indications of short feedback resource units for the stations identified by the station identifications; means for configuring the access point to transmit the MU-RTS; and means for decoding short feedback from the stations in accordance with the short feedback resource units, where the short feedback is in response to the MU-RTS.

In Example 73, the subject matter of Example 72 optionally includes MHz channels.

In Example 74, the subject matter of any one or more of Examples 72-73 optionally include MHz channels the MU-RTS is transmitted on.

In Example 75, the subject matter of any one or more of Examples 72-74 optionally include MHz channels.

In Example 76, the subject matter of any one or more of Examples 72-75 optionally include where the short feedback resource units further indicate one or more of a spatial stream and a time division of the one or more sub-carriers.

In Example 77, the subject matter of any one or more of Examples 72-76 optionally include MHz channels and an orthogonal frequency division multiple-access (OFDMA) resource unit.

In Example 78, the subject matter of any one or more of Examples 72-77 optionally include MHz channels for the short feedback resource units are determined from a corresponding OFDMA resource unit and a bandwidth of the trigger frame for polling.

In Example 79, the subject matter of any one or more of Examples 72-78 optionally include where the short feedback resource units begin in time after the stations transmit the NDP-CTSs.

Example 80 is a non-transitory computer-readable storage medium that stores instructions for execution by one or more processors, the instructions to configure the one or more processors to cause an apparatus of a station to: decode a multi-user (MU) request-to-send (RTS) (MU-RTS) including an identification of the station and an indication of 20 MHz channels for the station to transmit clear-to-sends (CTSs); determine which 20 MHz channels to transmit a CTS on for each of the channels indicated by the indication of 20 MHz channels; encode a CTS for each 20 MHz channel on which it is determined to transmit the CTS on; configure the station to transmit each CTS on a corresponding 20 MHz channel; decode a trigger frame for polling, the trigger frame including the station identification and an indication of a short feedback resource unit; and encode short feedback on the short feedback resource unit to indicate whether one or more of the CTSs are transmitted.

In Example 81, the subject matter of Example 80 optionally includes where the processing circuitry is further configured to: encode the short feedback on a corresponding short feedback resource unit of the short feedback resource units for each 20 MHz channel the station is configured to transmit the CTS on.

In Example 82, the subject matter of any one or more of Examples 80-81 optionally include MHz channels, and where the instructions further configure the one or more processors to cause an apparatus of a station to: determine which 20 MHz channels to transmit the CTS on for each of the channels indicated by the indication of 20 MHz channels based on performing a clear channel assessment (CCA) for each of the channels.

In Example 83, the subject matter of any one or more of Examples 80-82 optionally include where the processing circuitry is further configured to: determine which 20 MHz channels to transmit the CTS on for each of the channels indicated by the indication of 20 MHz channels based on performing the CCA for each of the channels and based on one or more network allocation vectors.

Example 84 is a method performed by an apparatus of a station, the method including: decoding a multi-user (MU) request-to-send (RTS) (MU-RTS) including an identification of the station and an indication of 20 MHz channels for the station to transmit clear-to-sends (CTSs); determining which 20 MHz channels to transmit a CTS on for each of the channels indicated by the indication of 20 MHz channels; encoding a CTS for each 20 MHz channel on which it is determined to transmit the CTS on; configuring the station to transmit each CTS on a corresponding 20 MHz channel; decoding a trigger frame for polling, the trigger frame including the station identification and an indication of a short feedback resource unit; and encoding short feedback on the short feedback resource unit to indicate whether one or more of the CTSs are transmitted.

In Example 85, the subject matter of Example 84 optionally includes the method further including: encoding the short feedback on a corresponding short feedback resource unit of the short feedback resource units for each 20 MHz channel the station is configured to transmit the CTS on.

In Example 86, the subject matter of any one or more of Examples 84-85 optionally include MHz channels, and where the method further comprises: determining which 20 MHz channels to transmit the CTS on for each of the channels indicated by the indication of 20 MHz channels based on performing a clear channel assessment (CCA) for each of the channels.

In Example 87, the subject matter of any one or more of Examples 84-86 optionally include MHz channels based on performing the CCA for each of the channels and based on one or more network allocation vectors.

Example 88 is an apparatus of a station, the apparatus including: means for decoding a multi-user (MU) request-to-send (RTS) (MU-RTS) including an identification of the station and an indication of 20 MHz channels for the station to transmit clear-to-sends (CTSs); means for determining which 20 MHz channels to transmit a CTS on for each of the channels indicated by the indication of 20 MHz channels; means for encoding a CTS for each 20 MHz channel on which it is determined to transmit the CTS on; means for configuring the station to transmit each CTS on a corresponding 20 MHz channel; means for decoding a trigger frame for polling, the trigger frame including the station identification and an indication of a short feedback resource unit; and means for encoding short feedback on the short feedback resource unit to indicate whether one or more of the CTSs are transmitted.

In Example 89, the subject matter of Example 88 optionally includes the apparatus further including: means for encoding the short feedback on a corresponding short feedback resource unit of the short feedback resource units for each 20 MHz channel the station is configured to transmit the CTS on.

In Example 90, the subject matter of any one or more of Examples 88-89 optionally include MHz channels, and where the apparatus further comprises: means for determining which 20 MHz channels to transmit the CTS on for each of the channels indicated by the indication of 20 MHz channels based on performing a clear channel assessment (CCA) for each of the channels.

In Example 91, the subject matter of any one or more of Examples 88-90 optionally include MHz channels based on performing the CCA for each of the channels and based on one or more network allocation vectors.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point comprising: a memory; and processing circuitry couple to the memory, wherein the processing circuitry is configured to:
    encode a multi-user (MU) request-to-send (RTS) (MU-RTS) comprising station identifications of stations and indications of 2.0 MHz channels for the stations to transmit clear-to-sends (CTSs);
    configure the access point to transmit the MU-RTS;
    encode a trigger frame for polling comprising the station identifications and indications of short feedback resource units for the stations, wherein the indications of the short feedback resource units comprise an indication of a 20 MHz channel of the 20 MHz channels and an orthogonal frequency division multiple-access (OFDMA) resource unit;
    configure the access point to transmit the trigger frame for polling; and
    decode short feedback from the stations in accordance with the indications of the short feedback resource units, wherein the short feedback is in response to the trigger frame for polling and the MU-RTS.

2. The apparatus of claim 1, wherein the processing circuitry is further configured to:
    determine which stations of the stations transmitted a CTS on which 20 MHz channels of MHz channels indicated by the indications of 20 MHz channels based on the short feedback from the stations.

3. The apparatus of claim 2, wherein the processing circuitry is further configured to:
    determine a station transmitted a CTS in response to the MU-RTS on a 20 MHz channel if short feedback is received from the station on the 20 MHz channel.

4. The apparatus of claim 1, wherein each station of the stations is allocated one short feedback resource unit and if short feedback is received on the one short feedback resource unit, it indicates that the each station has transmitted a CTS on each 20 MHz channel of the 20 MHz channels, and wherein the one short feedback resource unit is in a last 20 MHz channel or another 20 MHz channel of the 20 MHz channels.

5. The apparatus of claim 1, wherein the OFDMA resource unit comprises one or more from the following group: a sub-channel of a corresponding 20 MHz channel, one or more subcarriers of the 20 MHz channel, a time division of one or more subcarriers, and a spatial stream resource unit.

6. The apparatus of claim 1, wherein each short feedback corresponds to a report of whether a station of the stations transmitted a corresponding CTS on a corresponding 20 MHz channel, and wherein short resource units indicated by the indications of short resource units are orthogonal frequency division multiple-access (OFDMA) resource units.

7. The apparatus of claim 6, wherein the corresponding 20 MHz channel for the short feedback is indicated by a bandwidth of the trigger frame for polling.

8. The apparatus of claim 6, wherein each of the OFDMA resource units comprises one or more from the following group: a sub-channel of a 20 MHz channel, one or more subcarriers of a 20 MHz channel, a time division of one or more subcarriers, and a spatial stream.

9. The apparatus of claim 1, wherein the processing circuitry is further configured to:
    encode the MU-RTS to further comprise an indication that the CTSs are to be null data packet (NDP) CTSs.

10. The apparatus of claim 1, wherein the processing circuitry is further configured to:
    encode the MU-RTS to further comprise an indication of whether the stations are to perform carrier sensing before transmitting the CTSs, and not transmit the CTSs if the carrier sensing indicates a 20 MHz channel is busy.

11. The apparatus of claim 10, wherein the carrier sensing comprises a physical carrier sensing and a virtual carrier sensing, the virtual carrier sensing based on one or more network allocation vectors.

12. The apparatus of claim 1, wherein the stations and the access point are each one or more from the following group: an Institute of Electrical and Electronic Engineers (IEEE) 802.11ax access point, an IEEE 802.11 station, an IEEE access point, a station acting as a group owner (GO), IEEE 802.11az station, IEEE 802.11az access point, and an IEEE 802.11ax station.

13. The apparatus of claim 1, further comprising transceiver circuitry coupled to the memory; and one or more antennas coupled to the transceiver circuitry.

14. A non-transitory computer-readable storage medium that stores instructions for execution by one or more processors of an apparatus of an access point, the instructions to configure the one or more processors to:
    encode a trigger frame for polling and multi-user (MU) request-to-send (RTS) (MU-RTS) comprising station identifications and indications of 2.0 MHz channels for the stations to transmit null data packet (NDP) clear-to-sends (CTSs) (NDP-CTSs), the MU-RTS further comprising indications of short feedback resource units for the stations identified by the station identifications, wherein the short feedback resource units comprise an indication of a 20 MHz channel of the 20 MHz channels and an orthogonal frequency division multiple-access (OFDMA) resource unit;
    configure the access point to transmit the trigger frame for polling and MU-RTS; and
    decode short feedback from the stations in accordance with the short feedback resource units, wherein the short feedback is in response to the trigger frame for polling and MU-RTS.

15. The non-transitory computer-readable storage medium of claim 14, wherein the short feedback resource units indicate one or more sub-carriers on a 20 MHz channel of 20 MHz channels indicated b the indications of 20 MHz channels.

16. The non-transitory computer-readable storage medium of claim 14, wherein the indications of the short feedback resource units are one or more sub-carriers on a 20 MHz channel of 20 MHz channels the MU-RTS is transmitted on.

17. The non-transitory computer-readable storage medium of claim 14, wherein the indications of 20 MHz channels each comprise one or more from the following group: a same 20 MHz channel as a corresponding short feedback resource unit of the indications of short feedback resource units, 20 MHz channels in a primary 40 MHz channel if a corresponding short feedback resource unit is in a secondary 20/40/80 MHz channel, 20 MHz channels in a primary 80 MHz channel if a short feedback resource unit is in a secondary 40/80 MHz channel, 20 MHz channels in a secondary 80 MHz channel if a corresponding short feedback resource unit is in the secondary 80 MHz channels.

18. The non-transitory computer-readable storage medium of claim 14, wherein the short feedback resource units further indicate one or more of a spatial stream and a time division of the one or more sub-carriers.

19. The non-transitory computer-readable storage medium of claim 14, wherein the short feedback resource units indicated by the indications of short feedback resource units comprise an indication of an orthogonal frequency division multiple-access (OFDMA) resource unit, and indications of 20 MHz channels for the short feedback resource units are determined from a corresponding OFDMA resource unit and a bandwidth of the trigger frame for polling.

20. The non-transitory computer-readable storage medium of claim 14, wherein the short feedback resource units begin in time after the stations transmit the NDP-CTSs.

21. A method performed by an apparatus of an access point, the method comprising:
encoding a multi-user (MU) request-to-send (RTS) (MU-RTS) comprising station identifications and indications of 20 MHz channels for the stations to transmit clear-to-sends (CTSs);
configuring the access point to transmit the MU-RTS;
encoding a trigger frame for polling, the trigger frame comprising the station identifications and indications of short feedback resource units for the stations identified by the station identifications;
configuring the access point to transmit the trigger frame for polling;

decoding short feedback from the stations in accordance with the short feedback resource units; and
determining which stations of the stations transmitted a CTS on which 20 MHz channels of the 20 MHz channels based on the short feedback from the stations.

22. An apparatus of a station comprising: a memory; and processing circuitry couple to the memory, wherein the processing circuitry is configured to:
decode a multi-user (MU) request-to-send (RTS) (MU-RTS) comprising an identification of the station and an indication of 20 MHz channels for the station to transmit clear-to-sends (CTSs);
determine which 20 MHz channels to transmit a CTS on for each of the channels indicated by the indication of 20 MHz channels;
encode a CTS for each 20 MHz channel on which it is determined to transmit the CTS on;
configure the station to transmit each CTS on a corresponding 20 MHz channel;
decode a trigger frame for polling, the trigger frame comprising the station identification and an indication of a short feedback resource unit; and
encode short feedback on the short feedback resource unit to indicate whether one or more of the CTSs are transmitted.

23. The apparatus of claim 22, wherein the processing circuitry is further configured to:
encode the short feedback on a corresponding short feedback resource unit of the short feedback resource units for each 20 MHz channel the station is configured to transmit the CTS on.

24. The apparatus of claim 22, wherein the MU-RTS further comprises an indication for whether the station should perform a channel sense on each of the 20 MHz channels indicated by the indication of 20 MHz channels, and wherein the processing circuitry is configured to:
determine which 20 MHz channels to transmit the CTS on for each of the channels indicated by the indication of 20 MHz channels based on performing a clear channel assessment (CCA) for each of the channels.

25. The apparatus of claim 22, wherein the processing circuitry is further configured to:
determine which 20 MHz channels to transmit the CTS on for each of the channels indicated by the indication of 20 MHz channels based on performing the CCA for each of the channels and based on one or more network allocation vectors.

* * * * *

UNITED STATES PATENT AND TRADEMARK OFFICE
CERTIFICATE OF CORRECTION

PATENT NO. : 10,148,404 B2  
APPLICATION NO. : 15/378937  
DATED : December 4, 2018  
INVENTOR(S) : Huang et al.

Page 1 of 1

It is certified that error appears in the above-identified patent and that said Letters Patent is hereby corrected as shown below:

In the Claims

In Column 27, Line 30, in Claim 1, delete "2.0" and insert --20-- therefor

In Column 27, Line 49, in Claim 2, after "of", insert --20--

In Column 28, Line 51, in Claim 14, delete "2.0" and insert --20-- therefor

In Column 29, Line 2, in Claim 15, delete "b" and insert --by-- therefor

Signed and Sealed this
Fifth Day of January, 2021

Andrei Iancu
*Director of the United States Patent and Trademark Office*